United States Patent
Le et al.

(10) Patent No.: US 11,835,774 B2
(45) Date of Patent: Dec. 5, 2023

(54) FIBER OPTIC CONNECTOR PLUG AND ASSOCIATED CABLE SYSTEMS, CABLE ASSEMBLIES, AND METHOD

(71) Applicant: Amphenol Corporation, Wallingford, CT (US)

(72) Inventors: Phuc Thanh Le, Ho Chi Minh (VN); Hien Khuu, Ho Chi Minh (VN)

(73) Assignee: AMPHENOL CORPORATION, Wallingford, CT (US)

( * ) Notice: Subject to any disclaimer, the term of this patent is extended or adjusted under 35 U.S.C. 154(b) by 0 days.

(21) Appl. No.: 17/725,383

(22) Filed: Apr. 20, 2022

(65) Prior Publication Data

US 2023/0341635 A1  Oct. 26, 2023

(51) Int. Cl.
*G02B 6/38* (2006.01)
*G02B 6/36* (2006.01)
*G02B 6/35* (2006.01)

(52) U.S. Cl.
CPC ............ *G02B 6/387* (2013.01); *G02B 6/353* (2013.01); *G02B 6/3636* (2013.01); *G02B 6/3825* (2013.01); *G02B 6/3838* (2013.01); *G02B 6/3881* (2013.01)

(58) Field of Classification Search
None
See application file for complete search history.

(56) References Cited

U.S. PATENT DOCUMENTS

| | | | |
|---|---|---|---|
| 5,845,036 A * | 12/1998 | De Marchi | G02B 6/3825 385/139 |
| 6,688,780 B2 | 2/2004 | Duran | |
| 8,083,547 B2 * | 12/2011 | Roth | G02B 6/3817 439/607.1 |
| 10,158,194 B2 * | 12/2018 | Takano | G02B 6/3879 |
| 10,228,521 B2 * | 3/2019 | Gniadek | G02B 6/3893 |
| 10,816,736 B2 | 10/2020 | Lin et al. | |
| 11,152,748 B2 * | 10/2021 | Takano | G02B 6/3825 |
| 2002/0076164 A1 * | 6/2002 | Childers | G02B 6/3869 385/76 |
| 2007/0098329 A1 * | 5/2007 | Shimoji | G02B 6/3893 385/60 |
| 2011/0206325 A1 * | 8/2011 | Hioki | G02B 6/3849 385/76 |

(Continued)

FOREIGN PATENT DOCUMENTS

EP     2362254     2/2011

*Primary Examiner* — Jerry Rahll
(74) *Attorney, Agent, or Firm* — Kunzler Bean & Adamson

(57) ABSTRACT

A fiber optic connector plug includes a housing. The housing includes a central axis, opposing lateral sides and a top side extending between the opposing lateral sides, and an interior channel, extending through the housing, in a direction parallel to the central axis, from a first end portion of the housing to a second end portion of the housing. The housing also includes a latch, coupled to the housing at the top side. The housing further includes a ferrule, extending from the first end portion of the housing. The housing additionally includes a shutter, coupled to the first end portion of the housing such that the shutter is pivotable and translationally slidable, relative to the first end portion of the housing, between a closed position, in which the shutter covers the ferrule, and an open position, in which the shutter does not cover the ferrule.

21 Claims, 18 Drawing Sheets

(56) References Cited

U.S. PATENT DOCUMENTS

2011/0229085 A1\* 9/2011 Bradley ............... G02B 6/3871
29/857
2017/0205591 A1\* 7/2017 Takano ................ G02B 6/3879
2018/0156988 A1\* 6/2018 Gniadek ................ G02B 6/387

\* cited by examiner

FIBER OPTIC CONNECTOR PLUG AND ASSOCIATED CABLE SYSTEMS, CABLE ASSEMBLIES, AND METHOD

FIELD

This disclosure relates generally to fiber optics, and more particularly to fiber optic connector plugs, cable systems, and cable assemblies for transmitting fiber optic signals.

BACKGROUND

Fiber optic communication systems includes components that facilitate the transmission of information from one place to another by sending pulses of infrared light through one or more fiber optic cables. Some systems utilize adapters to couple together, and enable transmission of optical signals between, two or more fiber optic cables. To facilitate interconnectability of a fiber optic cable to other fiber optic cables or devices, the fiber optic cable can form part of a fiber optic cable assembly that also includes a fiber optic connector plug. The fiber optic connector plug is selectively insertable into and removable from an adapter. When the fiber optic connector plug, the adapter enables transmission of fiber optic signals between fiber optic cables connected to the adapter.

A fiber optic cable includes a glass core that transmits optical signals through the fiber optic cable and is sensitive to impact damage and contaminants. A fiber optic connector plug utilizes a ferrule to protect and properly position a glass core of the corresponding fiber optic cable. Because the ferrule protects and houses the glass core, the ferrule should be free of damage and contaminants before the fiber optic connector plug is inserted into an adapter. Sometimes a technician is required to inspect and clean the ferrule of a fiber optic connector plug before insertion of the fiber optic connector plug into the adapter. Such inspection and cleaning takes time and requires training and experience.

To help protect a ferrule from damage and/or contaminants during storage, handling, and prior to connecting to an adapter, some fiber optic connector plugs include a ferrule cover. The ferrule cover is manually separated or removed from the fiber optic connector plug before the fiber optic connector plug is inserted into an adapter. While such an arrangement provides some protection of the ferrule, the ferrule must still be inspected by a technician and the ferrule remains uncovered, and susceptible to damage and contaminants, for a period of time between removal of the ferrule cover and insertion into the adapter.

SUMMARY

The subject matter of the present application has been developed in response to the present state of the art, and, in particular, in response to the problems and needs of conventional devices and methods for protecting ferrules of fiber optic connector plugs. The subject matter of the present application helps protect the ferrule of an fiber optic connector plug by automatically uncovering the ferrule only when the ferrule is at least partially within an adapter. In view of the foregoing, the subject matter of the present application has been developed to provide a fiber optic connector plug, cable system, and cable assembly, that overcome at least some of the shortcomings of the prior art.

Disclosed herein is a fiber optic connector plug that comprises a housing. The housing comprises a central axis, opposing lateral sides and a top side extending between the opposing lateral sides, and an interior channel, extending through the housing, in a direction parallel to the central axis, from a first end portion of the housing to a second end portion of the housing. The housing also comprises a latch, coupled to the housing at the top side. The housing further comprises a ferrule, extending from the first end portion of the housing. The housing additionally comprises a shutter, coupled to the first end portion of the housing such that the shutter is pivotable and translationally slidable, relative to the first end portion of the housing, between a closed position, in which the shutter covers the ferrule, and an open position, in which the shutter does not cover the ferrule. The preceding subject matter of this paragraph characterizes example 1 of the present disclosure.

The fiber optic connector plug further comprises a biasing element coupled to the housing and to the shutter such that the biasing element biases the shutter into the closed position. The preceding subject matter of this paragraph characterizes example 2 of the present disclosure, wherein example 2 also includes the subject matter according to example 1, above.

The biasing element comprises a compression spring. The preceding subject matter of this paragraph characterizes example 3 of the present disclosure, wherein example 3 also includes the subject matter according to example 2, above.

The fiber optic connector plug further comprises a retention receptacle at the top side of the housing, wherein a portion of the compression spring is retained within the retention receptacle. The preceding subject matter of this paragraph characterizes example 4 of the present disclosure, wherein example 4 also includes the subject matter according to example 3, above.

The latch comprises a through-slot that is circumferentially closed. The compression spring passes through the through-slot of the latch. The preceding subject matter of this paragraph characterizes example 5 of the present disclosure, wherein example 5 also includes the subject matter according to example 4, above.

The shutter is pivotable, about a pivot axis that is perpendicular to the central axis, between the closed position and the open position. The preceding subject matter of this paragraph characterizes example 6 of the present disclosure, wherein example 6 also includes the subject matter according to any one of examples 1-5, above.

The shutter is translationally slidable, in a direction parallel to the central axis, between the closed position and the open position. The preceding subject matter of this paragraph characterizes example 7 of the present disclosure, wherein example 7 also includes the subject matter according to any one of examples 1-6, above.

The housing further comprises exterior ledges, each on a corresponding one of the opposing lateral sides of the housing and extending from the first end portion of the housing toward the second end portion of the housing, and exterior grooves, each on a corresponding one of the opposing lateral sides of the housing and extending, in a direction that is parallel to the central axis, from the first end portion of the housing toward the second end portion of the housing. The shutter is engaged with the exterior ledges and the exterior grooves of the housing such that the shutter is translationally slidable along the exterior ledges and the exterior grooves and is pivotable about a pivot axis that is perpendicular to the central axis and passes through the exterior grooves. The preceding subject matter of this paragraph characterizes example 8 of the present disclosure, wherein example 8 also includes the subject matter according to any one of examples 1-7, above.

The shutter comprises opposing pins. Each one of the opposing pins is engaged with, slidable along, and rotatable within a corresponding one of the exterior grooves of the housing. The preceding subject matter of this paragraph characterizes example 9 of the present disclosure, wherein example 9 also includes the subject matter according to example 8, above.

The first end portion of the housing has a maximum width in a direction perpendicular to the central axis and parallel to the top side. The shutter has a maximum width, in a direction perpendicular to the central axis and parallel to the top side. The maximum width of the first end portion of the housing is equal to or larger than the maximum width of the shutter. The preceding subject matter of this paragraph characterizes example 10 of the present disclosure, wherein example 10 also includes the subject matter according to any one of examples 1-9, above.

The shutter comprises at least one lever arm that extends above the top side of the housing. The preceding subject matter of this paragraph characterizes example 11 of the present disclosure, wherein example 11 also includes the subject matter according to example 10, above.

The shutter comprises opposing lever arms spaced apart from each other in the direction perpendicular to the central axis and parallel to the top side. A maximum distance from one of the opposing lever arms to the other of the opposing lever arms is equal to the maximum width of the shutter. The preceding subject matter of this paragraph characterizes example 12 of the present disclosure, wherein example 12 also includes the subject matter according to example 11, above.

The housing further comprises at least one exterior ledge, on one of the opposing lateral sides of the housing and extending from the first end portion of the housing toward the second end portion of the housing. The at least one lever arm comprises a convex surface and a concave surface that is opposite the convex surface. The convex surface of the at least one lever arm engages the at least one exterior ledge when the shutter pivots and translationally slides relative to the first end portion of the housing. The preceding subject matter of this paragraph characterizes example 13 of the present disclosure, wherein example 13 also includes the subject matter according to any one of examples 11-12, above.

The shutter further comprises a hood portion defining a leading end of the fiber optic connector plug when the shutter is in the closed position. The hood portion receives the ferrule when the shutter is in the closed position. The hood portion has a maximum width, in a direction perpendicular to the central axis and parallel to the top side, that is less than the maximum width of the shutter. The preceding subject matter of this paragraph characterizes example 14 of the present disclosure, wherein example 14 also includes the subject matter according to any one of examples 10-13, above.

The shutter comprises an overlapping portion that overlaps with the opposing lateral sides of the housing. The preceding subject matter of this paragraph characterizes example 15 of the present disclosure, wherein example 15 also includes the subject matter according to any one of examples 1-14, above The shutter is more translucent than the housing. The preceding subject matter of this paragraph characterizes example 16 of the present disclosure, wherein example 16 also includes the subject matter according to any one of examples 1-15, above.

When the shutter is in the open position, an entirety of the shutter is positioned away from the ferrule, extending from the first end portion of the housing, in a direction extending from the first end portion to the second end portion of the housing. The preceding subject matter of this paragraph characterizes example 17 of the present disclosure, wherein example 17 also includes the subject matter according to any one of examples 1-16, above.

Further disclosed herein is a fiber optic system. The fiber optic system comprises an adapter, comprising a connector receptacle and opposing ledges that define therebetween a first portion of a cross-sectional shape of the connector receptacle, within a plane perpendicular to an insertion direction. The cross-sectional shape of the connector receptacle further comprises a second portion and wherein the second portion is wider than the first portion. The fiber optic system also comprises a fiber optic connector plug. The fiber optic connector plug comprises a housing a central axis, opposing lateral sides and a top side extending between the opposing lateral sides, and an interior channel, extending through the housing, in a direction parallel to the central axis, from a first end portion of the housing to a second end portion of the housing. The fiber optic connector plug also comprises a latch, coupled to the housing at the top side. The fiber optic connector plug further comprises a ferrule, extending from the first end portion of the housing. The fiber optic connector plug additionally comprises a shutter, coupled to the first end portion of the housing such that the shutter is pivotable and translationally slidable, relative to the first end portion of the housing, between a closed position, in which the shutter covers the ferrule, and an open position, in which the shutter does not cover the ferrule. The connector plug is insertable into the connector receptacle of the adapter in the insertion direction such that the opposing ledges contact only the shutter and cause the shutter to pivot, relative to the first end portion of the housing, and such that an end wall of the connector receptacle contacts the shutter and causes the shutter to translationally slide, relative to the first end portion of the housing. The preceding subject matter of this paragraph characterizes example 18 of the present disclosure.

Additionally disclosed herein is a method of connecting a fiber optic connector plug to an adapter. The method comprises inserting the fiber optic connector plug, with a shutter of the fiber optic connector plug in a closed position covering a ferrule of the fiber optic connector plug, into a connector receptacle of the adapter such that the ferrule is at least partially within the connector receptacle and such that the shutter contacts the adapter before any other portion of the fiber optic connector plug. The method also comprises after inserting the fiber optic connector plug into the connector receptacle, such that the ferrule is at least partially within the connector receptacle, further inserting the fiber optic connector plug into the connector receptacle while sequentially pivoting the shutter to uncover the ferrule and translationally sliding the shutter away from the ferrule. The preceding subject matter of this paragraph characterizes example 19 of the present disclosure.

The method further comprises after translationally sliding the shutter away from the ferrule, removing the fiber optic connector plug from the connector receptacle while sequentially translationally sliding the shutter towards the ferrule and pivoting the shutter to cover the ferrule before the ferrule is entirely removed from within the connector receptacle. The preceding subject matter of this paragraph characterizes example 20 of the present disclosure, wherein example 20 also includes the subject matter according to example 19, above.

Also disclosed herein is a fiber optic cable assembly, comprising a fiber optic cable, comprising a glass core, and a fiber optic connector plug, coupled to an end portion of the fiber optic cable. The fiber optic connector plug comprises a housing, through which the glass core extends and comprises a central axis, opposing lateral sides and a top side extending between the opposing lateral sides, and an interior channel, extending through the housing, in a direction parallel to the central axis, from a first end portion of the housing to a second end portion of the housing. The fiber optic connector plug also comprises a latch, coupled to the housing at the top side. The fiber optic connector plug further comprises a ferrule, extending from the first end portion of the housing and within which a portion of the glass core is located. The fiber optic connector plug additionally comprises a shutter, coupled to the first end portion of the housing such that the shutter is pivotable and translationally slidable, relative to the first end portion of the housing, between a closed position, in which the shutter covers the ferrule, and an open position, in which the shutter does not cover the ferrule. The preceding subject matter of this paragraph characterizes example 21 of the present disclosure.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended numbered paragraphs, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The subject matter of the present disclosure includes various examples of a fiber optic connector plug, a fiber optic cable assembly, and a fiber optic cable system. The fiber optic connector plug, which can form part of the fiber optic cable assembly and the fiber optic cable system, helps keep a ferrule of the fiber optic connector plug covered and protected as the fiber optic connector plug is inserted into an adapter and as the fiber optic connector plug is removed from the adapter, while automatically uncovering the ferrule only when inside the and only while inserting the fiber optic connector plug into the adapter. Accordingly, the fiber optic connector plug does not require an additional step of manually separating a ferrule cover from the fiber optic connector plug before inserting the fiber optic connector plug into an adapter. Instead, the fiber optic connector plug of the present disclosure includes a shutter that is biased to cover the ferrule when not in use and automatically pivots and slides to uncover the ferrule when in use, without separating from the fiber optic connector plug. In this manner, the fiber optic connector plug of the present disclosure helps ensure the ferrule is protected and clean when the fiber optic connector plug is inserted into and removed from an adapter, which enables the fiber optic connector plug to be installed and uninstalled by both trained technicians and untrained laypersons.

Figure 1A:
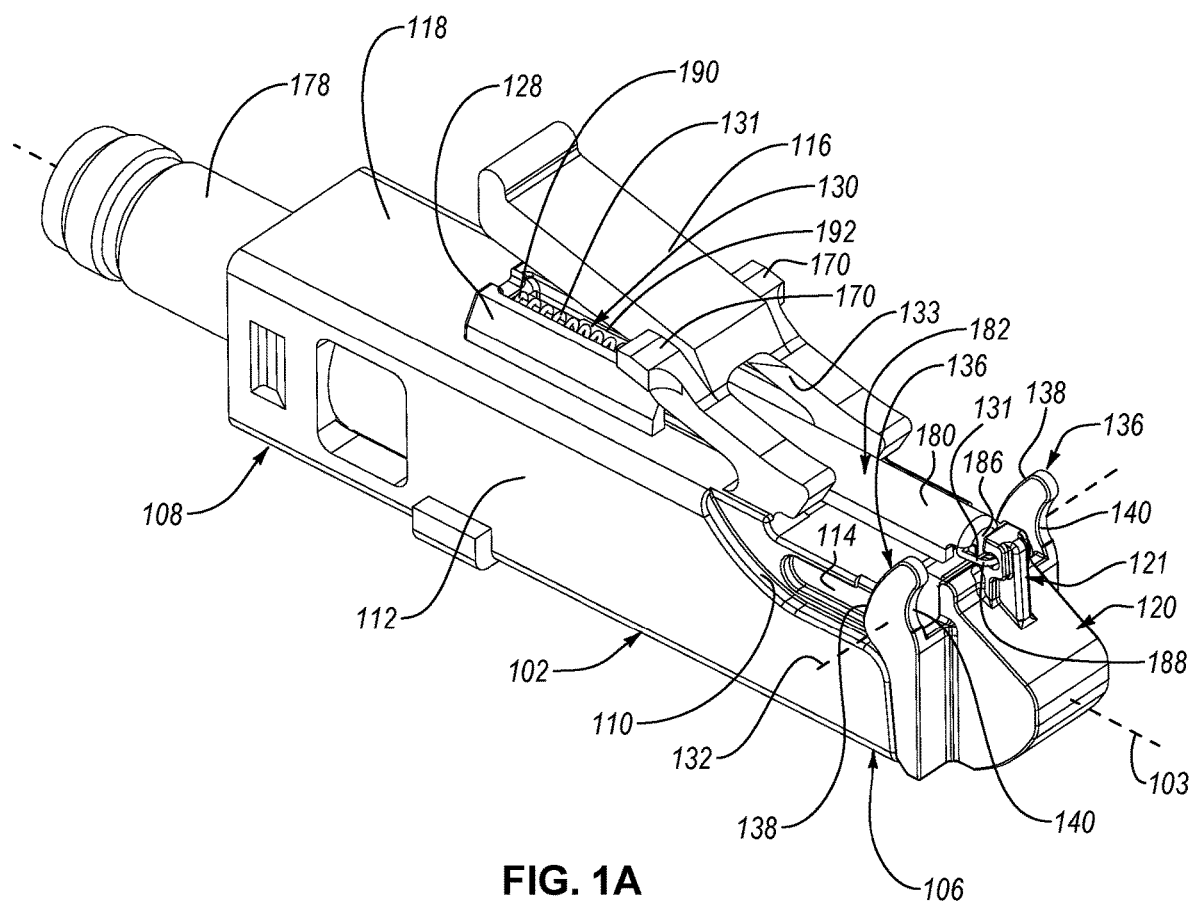
FIG. 1A is a perspective, schematic view of a fiber optic connector plug, according to one or more examples of the present disclosure.
Figure 1B:
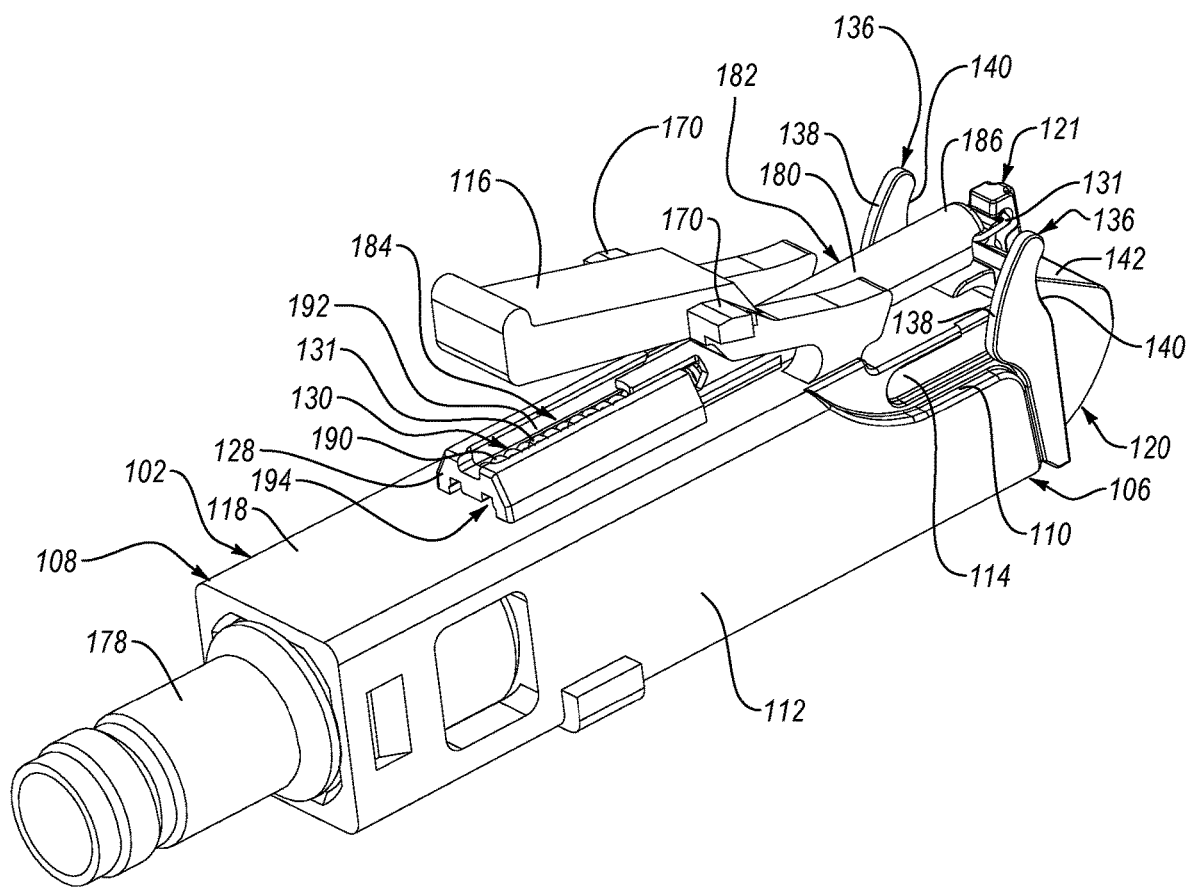
FIG. 1B is a perspective, schematic view of the fiber optic connector plug of FIG. 1A, according to one or more examples of the present disclosure.
Figure 1C:
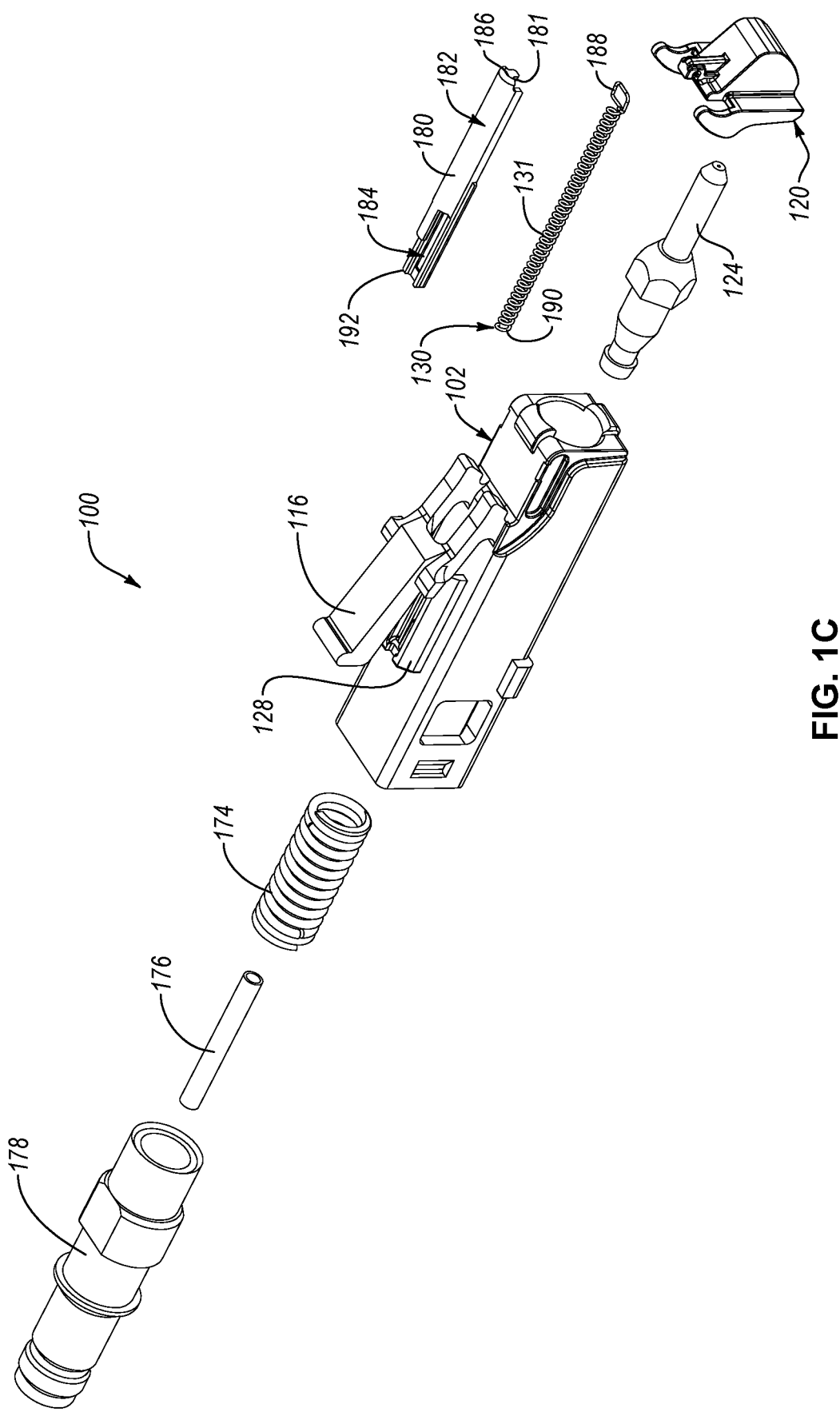
FIG. 1C is a perspective, schematic, exploded view of the fiber optic connector plug of FIG. 1A, according to one or more examples of the present disclosure.
Figure 2:
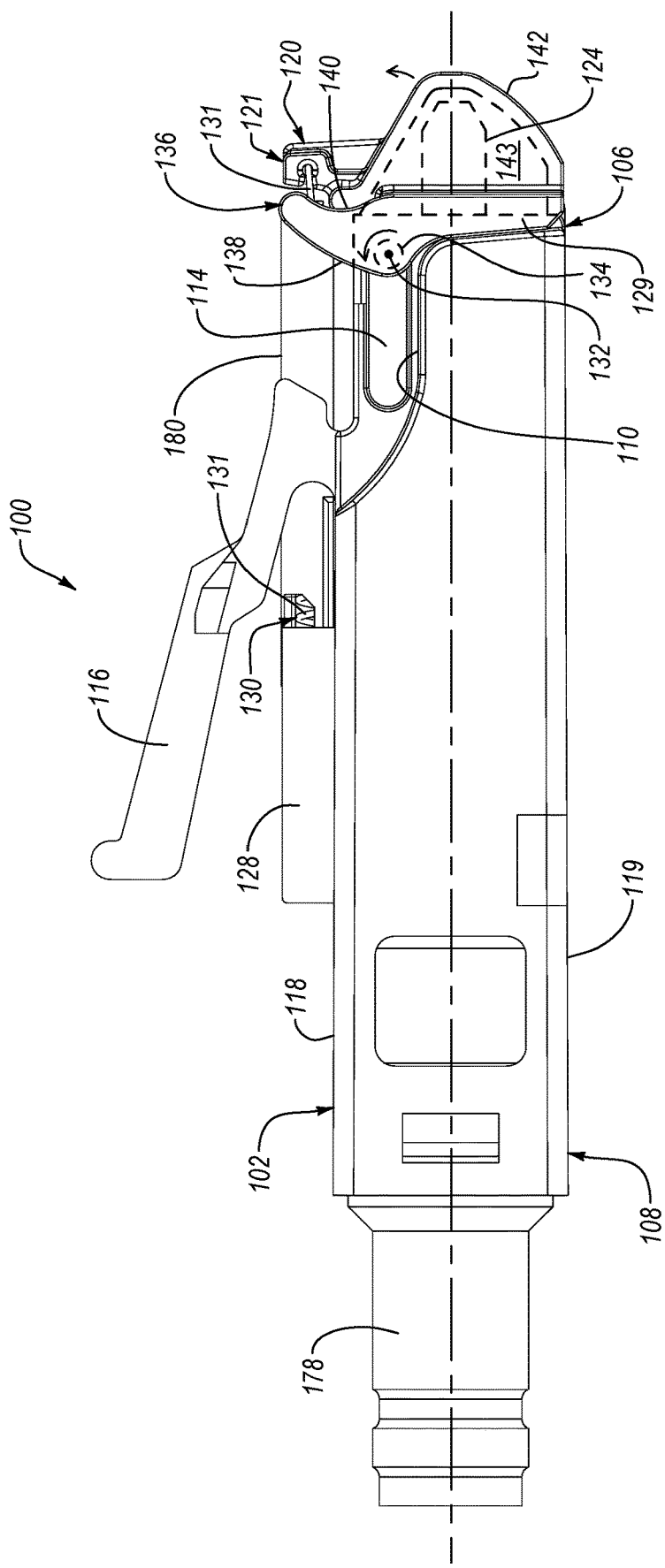
FIG. 2 is a side elevation, schematic view of the fiber optic connector plug of FIG. 1A, according to one or more examples of the present disclosure.

According to some examples, as shown in FIGS. 1A-2, a fiber optic connector plug 100 includes a housing 102, a latch 116, a ferrule 124, and a shutter 120. The housing 102 includes a central axis 103, which also defines a central axis of the fiber optic connector plug 100. The central axis 103 passes through a geometric center of the housing 102 in some examples. The housing 102 also includes opposing lateral sides 112, which are substantially parallel to each other, and a top side 118 that is substantially perpendicular to the opposing lateral sides 112. Additionally, the housing 102 includes a bottom side 119 that is substantially parallel to the top side 118 and substantially perpendicular to the opposing lateral sides 112. The housing 102 further includes an interior channel 104 that extends parallel to the central axis 103. The interior channel 104 is defined and circumferentially closed by the opposing lateral sides 112, the top side 118, and the bottom side 119 of the housing 102. The housing 102 has a cross-sectional shape, along a plane perpendicular to the central axis 103, that corresponds with a cross-sectional shape of a connector receptacle 152 of an adapter 150 (see, e.g., FIGS. 4 and 5). In one example, the cross-sectional shape of the housing 102 and the connector receptacle 152 is substantially square or substantially rectangular. The housing 102 additionally includes a first end portion 106, or leading end portion, and a second end portion 108, or trailing end portion. The first end portion 106 defines a leading end of the housing 102 and the second end portion 108 defines a trailing end of the housing 102. The interior channel 104 extends from the first end portion 106 to the second end portion 108. Accordingly, the interior channel 104 is a through-channel that extends entirely through the housing 102.

The latch 116 of the fiber optic connector plug 100 is coupled to the housing 102 at the top side 118 of the housing 102. The latch 116 includes a fixed end, which is non-movably fixed to the top side 118 of the housing 102, and a free end, which is opposite the fixed end and is movable relative to the top side 118. The latch 116 is configured to non-plastically (e.g., resiliently) deform, when a latching force is applied to the latch 116, along a plane that is parallel to the central axis 103, such that the free end moves toward the top side 118. When the latching force is removed, the latch 116 returns to its original shape, such that the free end moves away from the top side 118. The latch 116 additionally includes one or more laterally-protruding engagement prongs 170 located between the fixed end and the free end of the latch 116. In some examples, the latch 116 includes a through-slot 133 that extends through the fixed end of the latch 116. The through-slot 133 is circumferentially closed and at least partially defined by the top side 118 of the housing 102 in certain examples.

The ferrule 124 of the fiber optic connector plug 100 extends from the first end portion 106 of the housing 102. Accordingly, an exposed portion of the ferrule 124 protrudes from the leading end of the housing 102. The ferrule 124 is concentric with the central axis 103 of the housing 102. Additionally, the ferrule 124 is made of a rigid material, such as a metallic material, and includes a central channel through which a glass core 122 of a fiber optic cable 203 passes (see, e.g., FIG. 15). An unexposed portion of the ferrule 124 remains within the interior channel 104 of the housing 102. In some examples, the ferrule 124 is movable, along the central axis 103, relative to the housing 102. However, the fiber optic connector plug 100 is configured to at least bias (such as with a biasing element) the ferrule 124 such that the exposed portion of the ferrule 124 protrudes from the leading end of the housing 102. The exposed portion of the ferrule 124 has a hollow cylindrical shape in some examples.

Figure 15:
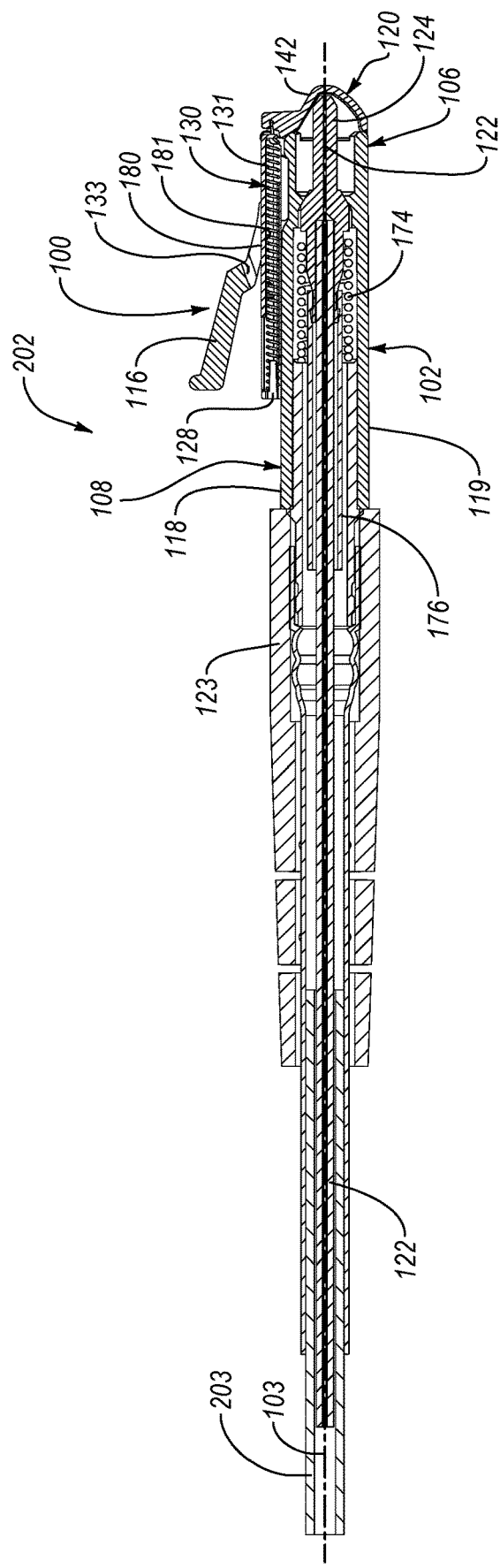
FIG. 15 is a schematic, side, cross-sectional view of a fiber optic cable assembly, taken along a line similar to line 15-15 of FIG. 14, according to one or more examples of the present disclosure.

Referring to FIGS. 1C and 15, the fiber optic connector plug 100 further includes an impact spring 174, a ferrule retention tube 176, and a cable interface fitting 178. The ferrule retention tube 176 retains a portion of the ferrule 124 such that the ferrule 124 and the ferrule retention tube 176 are co-movable within the housing 102. The cable interface fitting 178 is attached to the second end portion 108 of the housing 102 such that the cable interface fitting 178 is non-movable relative to the housing 102. The cable interface fitting 178 includes an interface that helps retain the fiber optic cable 203 to the cable interface fitting 178 and thus the housing 102. The impact spring 174 is located within the housing 102 and is interposed between the ferrule 124 and the cable interface fitting 178. The ferrule retention tube 176 is sized to move within the impact spring 174. The impact spring 174 helps prevent damage to the ferrule 124 when the ferrule 124 impacts an object. For example, when the ferrule 124 impacts an object, the ferrule 124 is allowed to retract into the housing 102, which compresses the impact spring 174 thereby cushioning the ferrule 124 against the impact.

Figure 7:
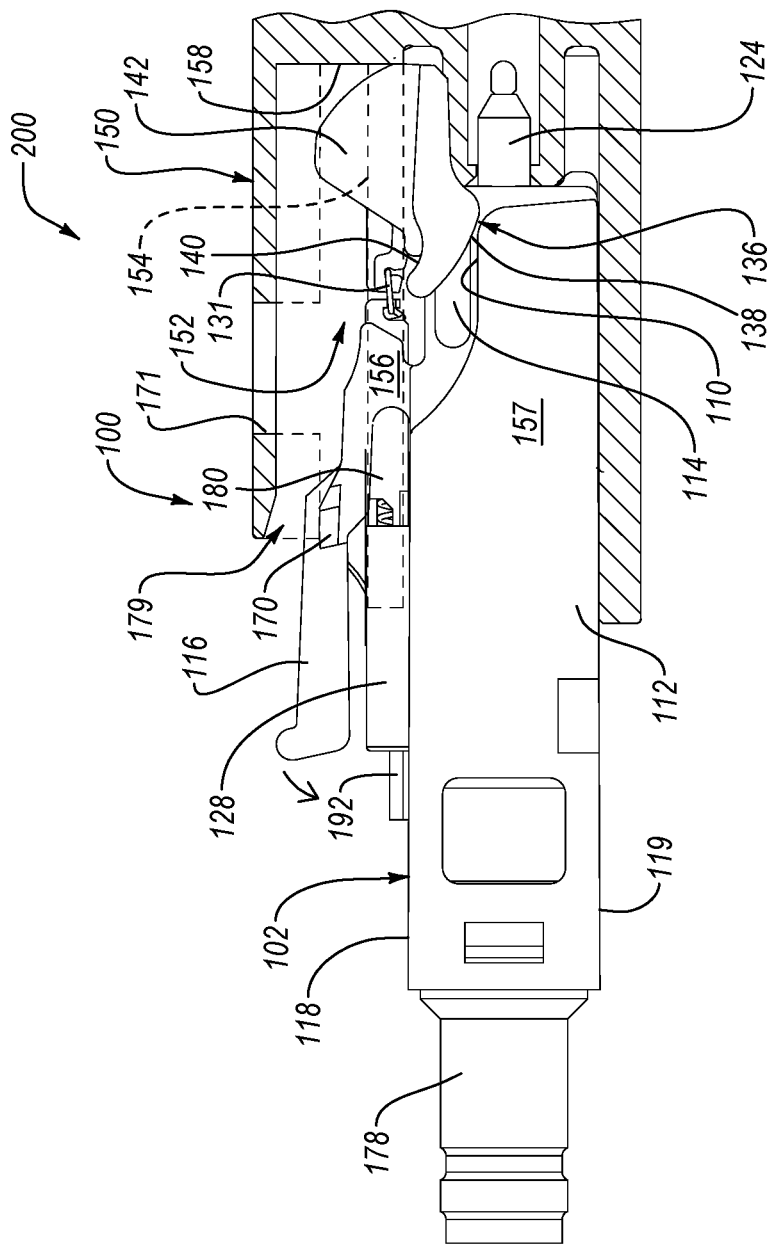
FIG. 7 is a side elevation, schematic view of the fiber optic cable system of FIG. 6A, according to one or more examples of the present disclosure.
Figure 8:
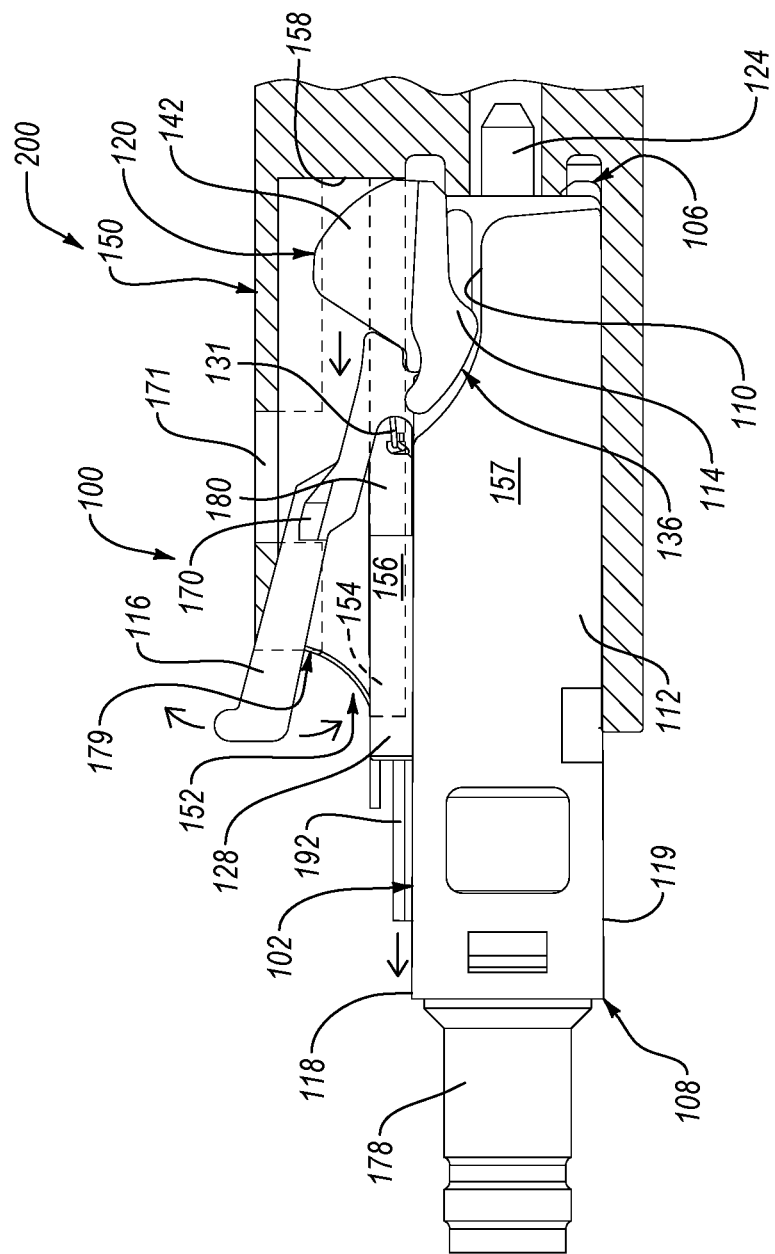
FIG. 8 is a side elevation, schematic view of the fiber optic cable system of FIG. 6A, according to one or more examples of the present disclosure.

The shutter 120 of the fiber optic connector plug 100 is coupled to the first end portion 106 of the housing 102 such that the shutter 120 is pivotable and translationally slidable relative to the first end portion 106 of the housing 102. More specifically, the shutter 120 is pivotable and translationally slidable between a closed position and an open position. As used herein, a range of between X and Y means the range includes X and Y. In the closed position, as shown in FIGS. 1 and 2, the shutter 120 covers the exposed portion of the ferrule 124. In the open position, as shown in FIG. 8, the shutter 120 does not cover the exposed portion of the ferrule 124 and is retraced away from the exposed portion of the ferrule 124. The shutter 120 is further pivotable between the closed position and an intermediate position (see, e.g., FIG. 7). In the intermediate position, the shutter 120 does not cover the exposed portion of the ferrule 124, but is not retracted away from the exposed portion of the ferrule 124.

Accordingly, movement of the shutter 120 between the open position and the closed position includes sequential pivoting of the shutter 120 and translational sliding of the shutter 120 relative to the housing 102.

According to some examples, the fiber optic connector plug 100 additionally includes a biasing element 130. The biasing element 130 is coupled to the housing 102 and to the shutter 120. The biasing element 130 is configured to bias or urge the shutter 120 into the closed position. Accordingly, the biasing element 130 can be any of various mechanisms or devices that operate to urge the shutter 120 into the closed position. In one example, the biasing element 130 is a compression spring 131 that extends between the housing 102 and the shutter 120. One end of the biasing element 130 is fixed to the housing 102 and an opposite end of the biasing element 130 is fixed to the shutter 120. More specifically, in some examples, the one end of the biasing element 130 is fixed to the top side 118 of the housing 102 and the biasing element 130 extends along the top side of the housing 102. In alternative examples, other types of biasing elements can be used, such as elastomeric components or metal stamped components.

In certain examples, the fiber optic connector plug 100 includes a retention receptacle 128 and a retention cover 180 that cooperate to protect the biasing element 130 and retain the biasing element 130 to the housing 102. The retention receptacle 128 is located on the top side 118 of the housing 102. In one example, the retention receptacle 128 is co-formed with the housing 102, such that the retention receptacle 128 and the housing form a one-piece seamless monolithic construction. In another example, however, the retention receptacle 128 is formed separately from the housing 102 and attached to the housing 102, such as attached to the top side 118 of the housing 102. The retention receptacle 128 is sized to receive and retain a portion of the biasing element 130. For example, when the biasing element 130 is a compression spring 131, the retention receptacle 128 is a partially circular-shaped pocket into which the compression spring 131 in inserted. The retention receptacle 128 can have any of various lengths sufficient to retain the biasing element 130 relative to the housing 102. To avoid obstructing operation of the latch 116, the biasing element 130 extends through the through-slot 133 of the latch 116. The through-slot 133 is sized such that movement of the latch 116 toward and away from the housing 102 is not obstructed by the biasing element 130.

Additionally, the retention receptacle 128 is sized to receive and retain a portion of the retention cover 180. Moreover, the retention receptacle 128 enables slidable movement of the retention cover 180, relative to the housing 102 and in a direction parallel to the central axis 103 of the housing 102. The retention cover 180 also includes a slot 181 (see, e.g., FIG. 1C) that is sized to receive the biasing element 130. The slot 181 includes a covered portion 182 and an uncovered portion 184. The covered portion 182 is forward of, or closer to the first end portion 106 of the housing 102 than, the uncovered portion 184. The slot 181 is sized to receive and retain therein the retention element 130. Moreover, a leading end 186 of the retention cover 180 is fixed to a leading end 188 of the retention element 130, such that the leading end 186 of the retention cover 180 co-moves with the leading end 188 of the retention element 130. In some examples, the leading end 186 of the retention cover 180 includes a tab that engages the leading end 188 of the retention element 130. However, a trailing end 192 of the retention cover 180 moves relative to a trailing end 190 of the retention element 130. More specifically, the trailing end 190 of the of the retention element 130 is fixed to the retention receptacle 128, but the retention cover 180 is allowed to move within and along the retention receptacle 128 such that the trailing end 192 of the retention cover 180 can extend from and retract into the retention receptacle 128.

Figure 3:
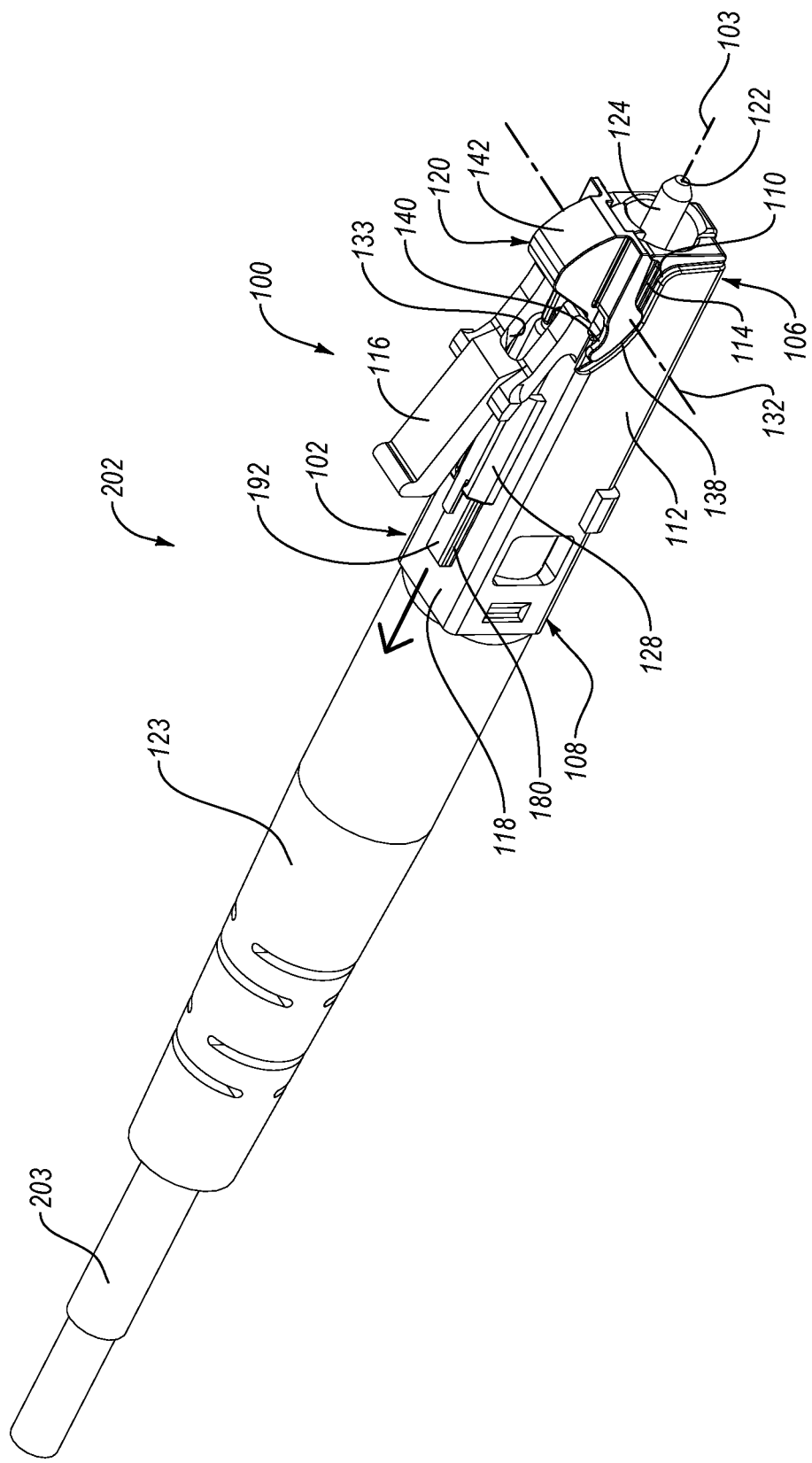
FIG. 3 is a perspective, schematic view of the fiber optic connector plug of FIG. 1A, according to one or more examples of the present disclosure.
Figure 14:
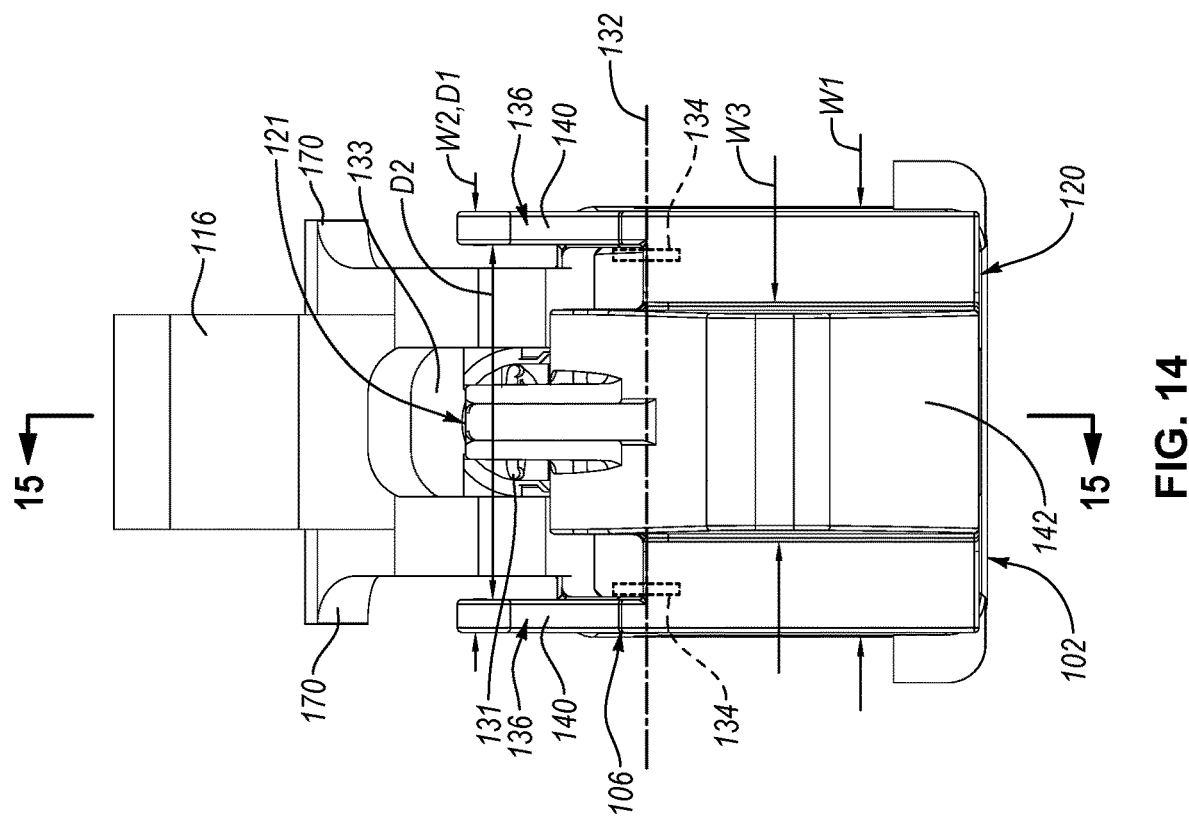
FIG. 14 is a schematic, front view of the fiber optic connector plug of FIG. 1A, according to one or more examples of the present disclosure.

Referring to FIGS. 1B and 3, the retention receptacle 128 includes a slot 194, which is at least partially defined by the top side 118 of the body 102. The trailing end 192 of the retention cover 180 is retained within the slot 194 and is configured to slide along the slot 194 as the shutter 120 opens and closes. When the shutter 120 is in the closed position, as shown in FIGS. 1A and 1B, no portion of the retention cover 180 extends out of the slot 194. But, when the shutter 120 is in the open position, as shown in FIG. 3, a portion of the retention cover 180 extends rearwardly out of the slot 194. To avoid obstructing operation of the latch 116, the retention cover 180 extends through the through-slot 133 of the latch 116. The through-slot 133 is sized such that movement of the latch 116 toward and away from the housing 102 is not obstructed by the retention cover 180. In this manner, the features for biasing the shutter 120 (e.g., the biasing element 130, the retention cover 180, and the retention receptacle 128) do not affect the ability of the fiber optic connector plug 100, including the latch 116, to be connected to and engaged with an existing standard adapter, such as the adaptor 150. Accordingly, when the fiber optic connector plug 100 is fully inserted into a standard adaptor, and the latch 116 is engaged with the prong receptacles of the standard adaptor, the features for biasing the shutter 120 are between the latch 116 and the body 102. Additionally, as shown in FIG. 14, the features for biasing the shutter 120 are located within the peripheral outline or confines of the latch 116, whether the latch 116 is in the fully extended position, as shown in FIG. 14, or the fully retracted position, as shown in FIG. 7.

The shutter 120 includes a biasing-element engagement portion 121 that receives and retains an end of the biasing element 130 that is opposite the end of the biasing element 130 retained by the retention receptacle 128. The biasing-element engagement portion 121 of the shutter 120 enables rotation of the shutter 120, relative to the biasing element 130, and a transfer of forces between the shutter 120 and the biasing element 130, while the biasing element 130 is retained by the biasing-element engagement portion 121. In one example, the biasing-element engagement portion 121 includes a slot or opening that receives an engagement end (e.g., an L-shaped or U-shaped or looped portion) of the biasing element 130, which can be the same as the leading end 188 of the retention element 130.

When retained by the biasing-element engagement portion 121, biasing element 130 applies a closing force to the shutter 120 that is perpendicular to and offset from a pivot axis 132 about which the shutter 120 is pivotable. The closing force urges rotation of the shutter 120, about the pivot axis 132, and into contact with the leading end of the housing 102. When in contact with the leading end of the housing 102, the shutter 120 is in the closed position. Application of an opening force, greater than and opposite the closing force, to the shutter 120 overcomes the bias of the biasing element 130 and causes the shutter 120 to pivot from the closed position into the intermediate position (see, e.g., FIG. 7). Further application of an opening force greater than the closing force results in the shutter 120 sliding rearwardly away from the leading edge of the housing 102 in a direction parallel to the central axis 103, which translationally moves the shutter 120 from the intermediate position to the open position (see, e.g., FIG. 8). When the biasing element 130 is a compression spring 131, as the shutter 120 is pivoted into the intermediate position, the compression spring 131 is compressed. Moreover, as the shutter 120 is translationally moved rearwardly, the compression spring 131 is further compressed. A release or lowering of the opening force, to a force lower than the closing force, enables the closing force supplied by the biasing element 130 to translationally slide the shutter 120 forwardly and pivot the shutter 120 into the closed position. When the biasing element 130 is a compression spring 131, as the shutter 120 translationally slides and pivots into the closed position, the compression spring 131 at least partially decompresses.

As presented above, the shutter 120 is pivotable about the pivot axis 132, which is perpendicular to the central axis 103 of the housing 102. The shutter 120 includes opposing pins 134 on opposite sides of the shutter 120 (see, e.g., FIG. 2). The opposing pins 134 extend toward each other. Moreover, the pivot axis 132 extends though the opposing pins 134 such that the opposing pins 134 rotate about the pivot axis 132 to effectuate the pivoting motion of the shutter 120. In the illustrated example, each one of the opposing pins 134 has a circular cross-sectional shape.

The housing 102 further includes exterior ledges 110 and exterior grooves 114. One of the exterior ledges 110 is formed in one of the opposing lateral sides 112 of the housing 102 and the other one of the exterior ledges 110 is formed in the other one of the opposing lateral sides 112 of the housing 102. Similarly, one of the exterior grooves 114 is formed in one of the opposing lateral sides 112 of the housing 102 and the other one of the exterior grooves 114 is formed in the other one of the opposing lateral sides 112 of the housing 102. The exterior ledges 110 and the exterior grooves 114 extend from the first end portion 106 of the housing 102 toward the second end portion of the housing 102. In some examples, the exterior grooves 114 and at least a portion of the exterior ledges 110 are parallel to the central axis 103 of the housing. Accordingly, in some examples, the exterior grooves 114 and at least a portion of the exterior ledges 110 are parallel to each other. The exterior ledges 110 each defines a narrow surface and the exterior grooves 114 each defines a recessed track.

The shutter 120 engages the exterior ledges 110 and the exterior grooves 114 of the housing 102. Engagement between the shutter 120 and the exterior ledges 110 and the exterior grooves 114 enables retention of the shutter 120 to the housing 102, as well as controlled and predictable pivoting and slidable translation of the shutter 120 relative to the housing 102. More specifically, opposing portions of the shutter 120 engage the exterior ledges 110 and sequentially roll along and translationally slide along the exterior ledges 110 as the shutter 120 moves from the closed position to the open position, and vice versa. Similarly, each one of the opposing pins 134 engages a corresponding one of the exterior grooves 114 and sequentially rotates within and translationally slides along the corresponding one of the exterior grooves 114 as the shutter moves from the closed position to the open position, and vice versa. The exterior grooves 114 are sized to receive and retain the opposing pins 134, while allowing the opposing pins 134 to rotate and translationally slide within the exterior grooves 114. Retention of the shutter 120 to the housing 102 is at least partially enabled by retention of the opposing pins 134 within the exterior grooves 114.

Figure 4:
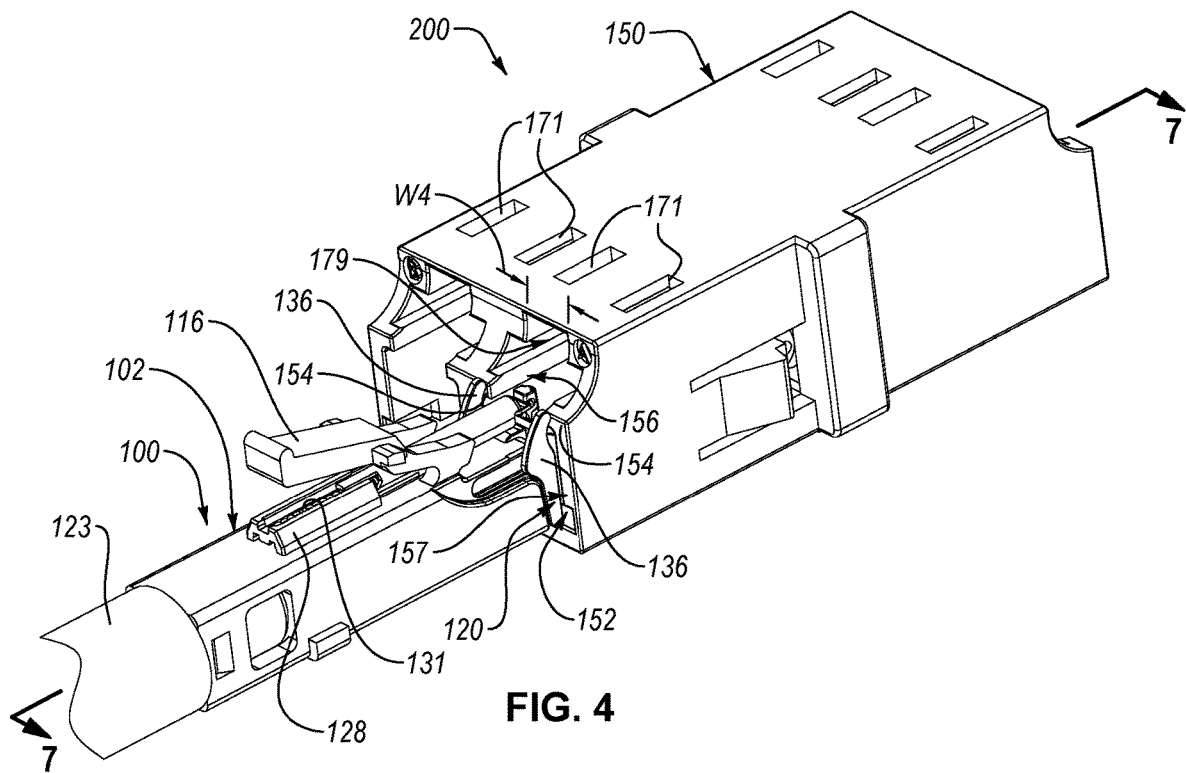
FIG. 4 is a perspective, schematic view of a fiber optic cable system, which includes the fiber optic connector plug of FIG. 1A, according to one or more examples of the present disclosure.
Figure 5:
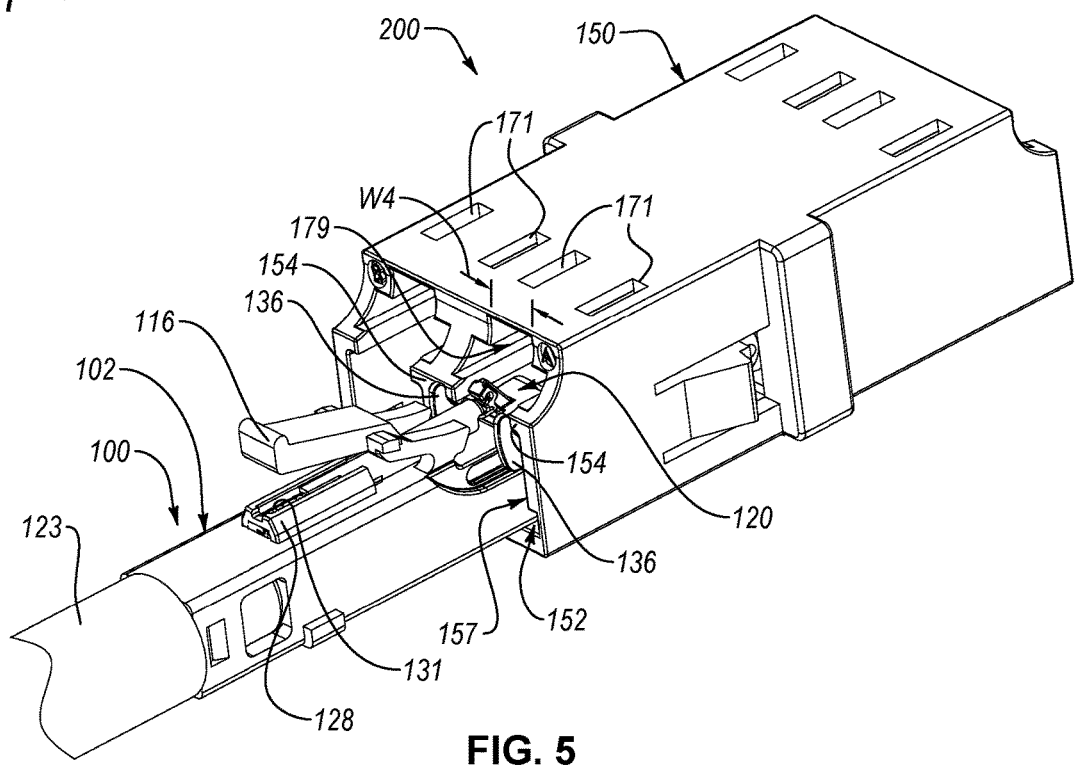
FIG. 5 is a perspective, schematic view of a fiber optic cable system, which includes the fiber optic connector plug of FIG. 1A, according to one or more examples of the present disclosure.
Figure 11:
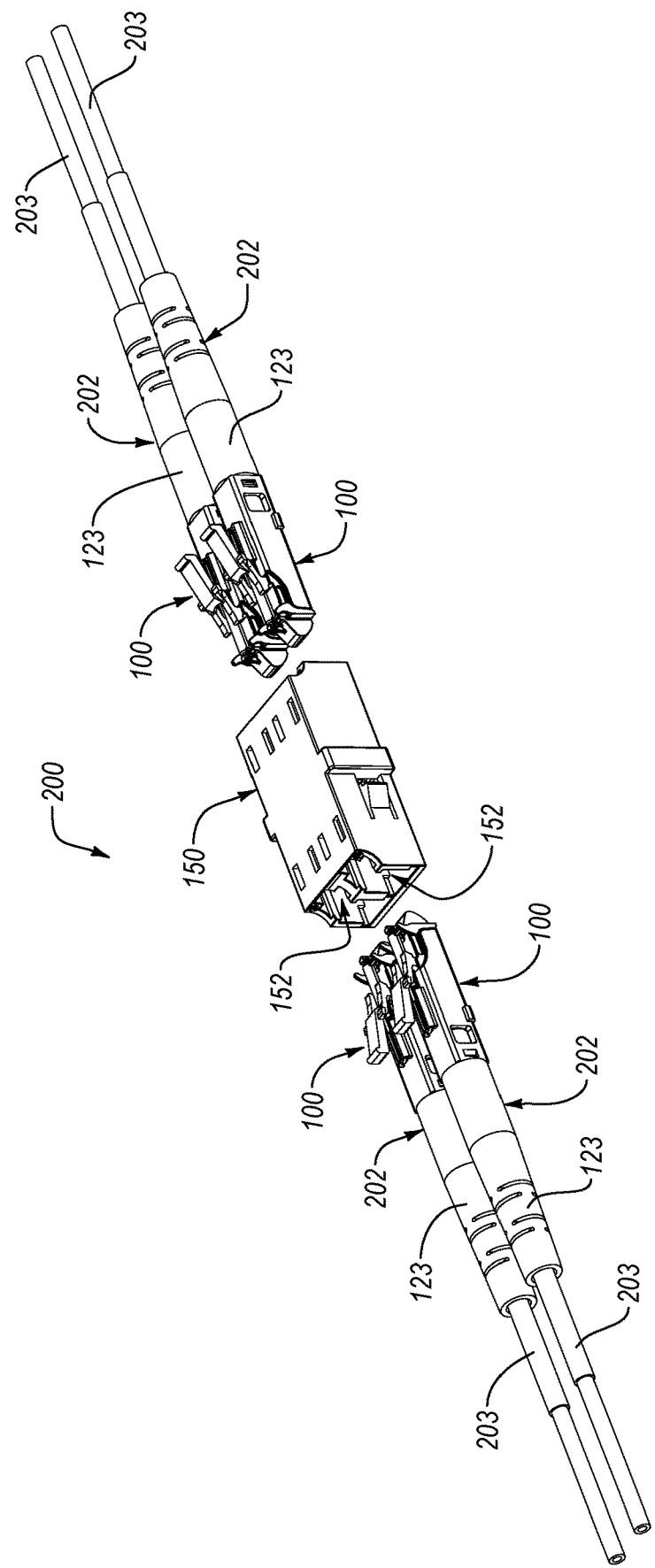
FIG. 11 is a perspective, schematic view of a fiber optic cable system, according to one or more examples of the present disclosure.
Figure 12:
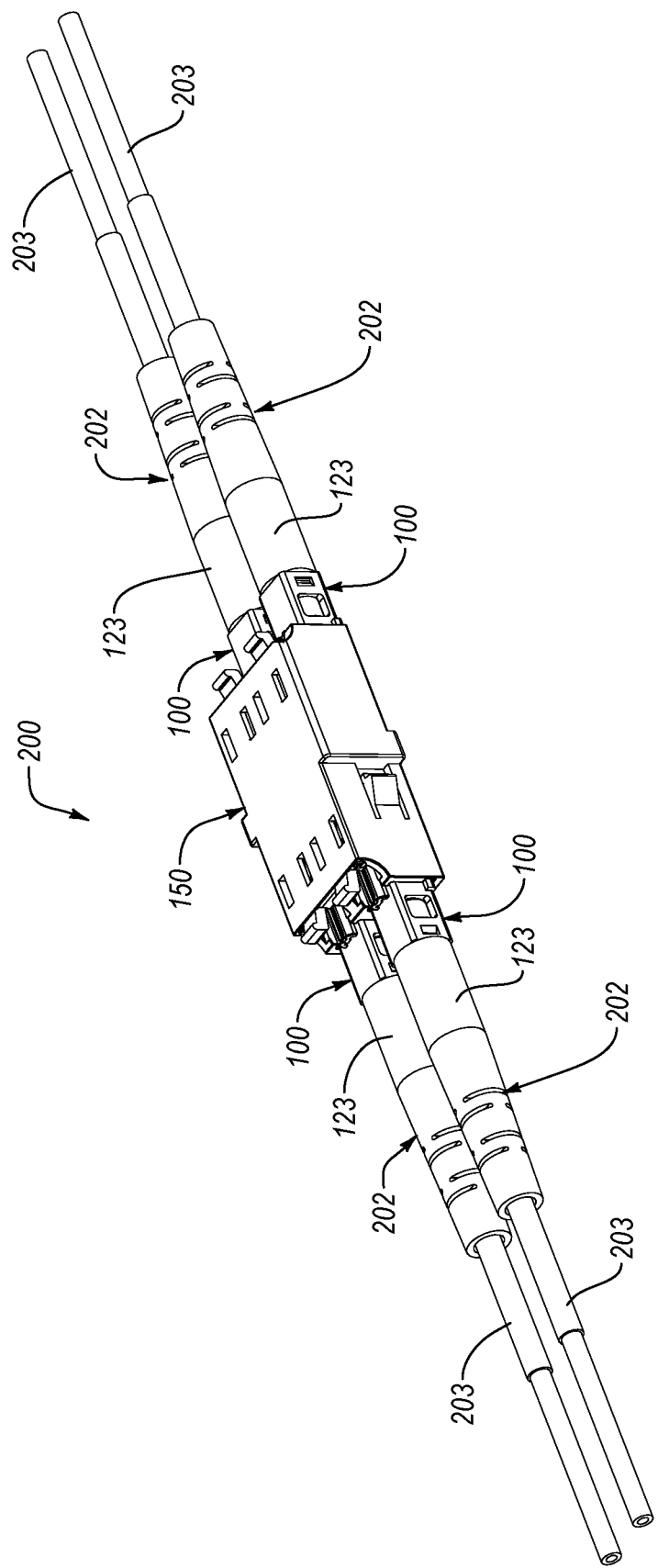
FIG. 12 is a perspective, schematic view of the fiber optic cable system of FIG. 11, according to one or more examples of the present disclosure.

The housing 102 is sized and shaped to nestably engage and fit within the connector receptacle 152 of an adapter 150. The adaptor 150 and the fiber optic connector plug 100 collectively define a fiber optic cable system 200. The fiber optic cable system 200 additionally includes the fiber optic cable 203. Moreover, the adapter 150 can be a standard LC in some examples (e.g., according to the LC Adapter Standard in IEC 61754-20 or TIA 604-10, which include Simplex, Duplex, Quad, and Active device receptacle adapters). Referring to FIGS. 4 and 5, the adapter 150 further includes opposing ledges 154 that run the length of the connector receptacle 152 and define therebetween a first portion 156 of the connector receptacle 152. The connector receptacle 152 has a particular cross-sectional shape, within a plane that is perpendicular to an insertion direction of the fiber optic connector plug 100 into the connector receptacle 152. The connector receptacle 152 further includes a second portion 157 contiguous with the first portion 156. The second portion 157 has a cross-sectional shape that is wider than the cross-sectional shape of the first portion 156. In other words, the first portion 156 is narrower than the second portion 157. In some examples, as shown in FIGS. 11 and 12, the adapter 150 includes multiple, identical connector receptacles 152 each configured to connect to a corresponding one of multiple fiber optic connector plugs 100.

Referring again to FIGS. 4 and 5, the connector receptacle 152 also includes a latch-passthrough portion 179 that is contiguous with the first portion 156, such that the first portion 156 is interposed between the latch-passthrough portion 179 and the second portion 157. The latch-passthrough portion 179 is sized to receive the latch 116 when the connector plug 100 is inserted into the adapter 150. For example, the latch-passthrough portion 179 has a minimum width W4, in a direction perpendicular to the central axis 103 and parallel to the top side 118, that is greater than a maximum width of the latch 116 and a maximum width W3 of a hood portion 142 of the shutter 120, described in more detail below.

Referring to FIG. 14, the first end portion 106 of the housing 102 (and the second end portion 108 of the housing 102 in some examples) has a maximum width W1. The maximum width W1, and all widths referenced herein, unless explicitly noted otherwise, is a dimension of the housing 102 that perpendicular to the central axis 103 and parallel to the top side 118 of the housing 102. The shutter 120 has a maximum width W2 that is parallel to the maximum width W1 of the housing 102. In some examples, the maximum width W2 of the shutter 120 is no bigger than the maximum width W1 of the housing 102. According to certain examples, as shown, the maximum width W2 of the shutter 120 is equal to or smaller than the maximum width W1 of the housing 102. Because the width W2 of the shutter 120 is no bigger than the width W1 of the housing 102, the shutter 120 can fit within the connector receptacle 152 and, in some examples, be nestably engaged with the connector receptacle 152.

The shutter 120 is configured to engage the adapter 150, as the fiber optic connector plug 100, with the shutter 120 in the closed position, is inserted into the connector receptacle 152 of the adapter 150, such the shutter 120 automatically pivots and translationally slides from the closed position to the open position. Engagement between the shutter 120 and the adapter 150, which enables automatically pivoting and translationally sliding of the shutter 120 relative to the housing 102, is facilitated by at least one lever arm 136 of the shutter 120. In the illustrated examples, the shutter 120 includes two opposing lever arms 136, which are spaced apart from each other in a direction perpendicular to the central axis 103 and parallel to the top side 118 of the housing 102. In such examples, the biasing-element engagement portion 121 is interposed between the opposing lever arms 136.

The shutter 120 will be hereinafter described as having two opposing lever arms 136, however, it is recognized that engagement between the shutter 120 and the adapter 150 can be accomplished with a different number of lever arms 136 (for example, just one lever arm 136) if desired. When the shutter 120 has two opposing lever arms 136, a maximum distance D1 from one of the opposing lever arms 136 to the other of the opposing lever arms 136 is no greater than the maximum width W2 of the shutter 120. In some examples, the maximum distance D1 from one of the opposing lever arms 136 to the other of the opposing lever arms 136 is equal to the maximum width W2 of the shutter 120, which can be equal to the maximum width W1 of the housing 102. Therefore, in some examples, the opposing lever arms 136 define the maximum width of the fiber optic connector plug 100, or are located at the further widthwise extent of the fiber optic connector plug 100. Accordingly, the opposing lever arms 136 are sized to be insertable into the connector receptacle 152 of the adapter 150.

Each one of the lever arms 136 includes an engagement surface and a housing engagement surface. The engagement surface is configured to engage a portion of the adapter 150 to effectuate rotation of the shutter 120. The housing engagement surface is configured to engage the housing 102 to enable rotation and slidable translation of the shutter 120. The engagement surface includes a concave surface 140 and the housing engagement surface includes a convex surface 138. The concave surface 140 is on an opposite side of the lever arm 136 than the convex surface 138. Moreover, when the shutter 120 is in the closed position, the concave surface 140 faces generally away from the second end portion 108 of the housing 102 and the convex surface 138 faces generally toward the second end portion 108 of the housing 102.

The convex surface 138 of each one of the lever arms 136 contacts a corresponding one of the exterior ledges 110. The convex nature of the convex surface 138 promotes smooth rolling of the convex surfaces 138 along the exterior ledges 110 as the shutter 120 pivots relative to the housing 102. Additionally, the convex surfaces 138 are capable of sliding along the exterior ledges 110 as the shutter 120 translationally slides into and out of the open position.

As shown in FIGS. 4-6A, the lever arms 136 are located laterally on the fiber optic connector plug 100 such that the concave surfaces 140 of the lever arms 136 contact corresponding ones of two opposing ledges 154 of the connector receptacle 152 of the adapter 150. Moreover, the lever arms 136 are located upwardly (e.g., protrude) from the top side of the housing 102 and forwardly on the fiber optic connector plug 100 such that the concave surfaces 140 of the lever arms 136 are the first surfaces of the fiber optic connector plug 100 to directly contact the adapter 140 as the fiber optic connector plug 100 is being properly inserted into connector receptacle 152 of the adapter 150. Proper insertion of the fiber optic connector plug 100 into the connector receptacle 152 occurs when the central axis 103 of the housing 102 is coaxial with a central axis of the connector receptacle 152. During insertion of the fiber optic connector plug 100 into the connector receptacle 152, contact with external surfaces of the opposing ledges 154 applies the opening force to the concave surfaces 140 of the lever arms 136, which, as discussed above, pivots the shutter 120 out of the closed position and into the intermediate position. The concave nature of the concave surfaces 140 promotes a smooth pivoting of the shutter 120 as the fiber optic connector plug 100 is further inserted into the connector receptacle 152.

The shutter 120 continues to pivot as the concave surfaces 140 remain in contact with the external surfaces of the ledges 154 and as the fiber optic connector plug 100 is further inserted. After sufficient insertion of the fiber optic connector plug 100, the concave surfaces 140 move past the external surfaces of the ledges 154 and the shutter 120 stops rotating (see, e.g., FIG. 6B). In some examples, the maximum rotation of the shutter 120 from the closed position is about 180°. Accordingly, the shutter 120 is pivotable at least 180° between the closed position and the open position in some examples.

Figure 6A:
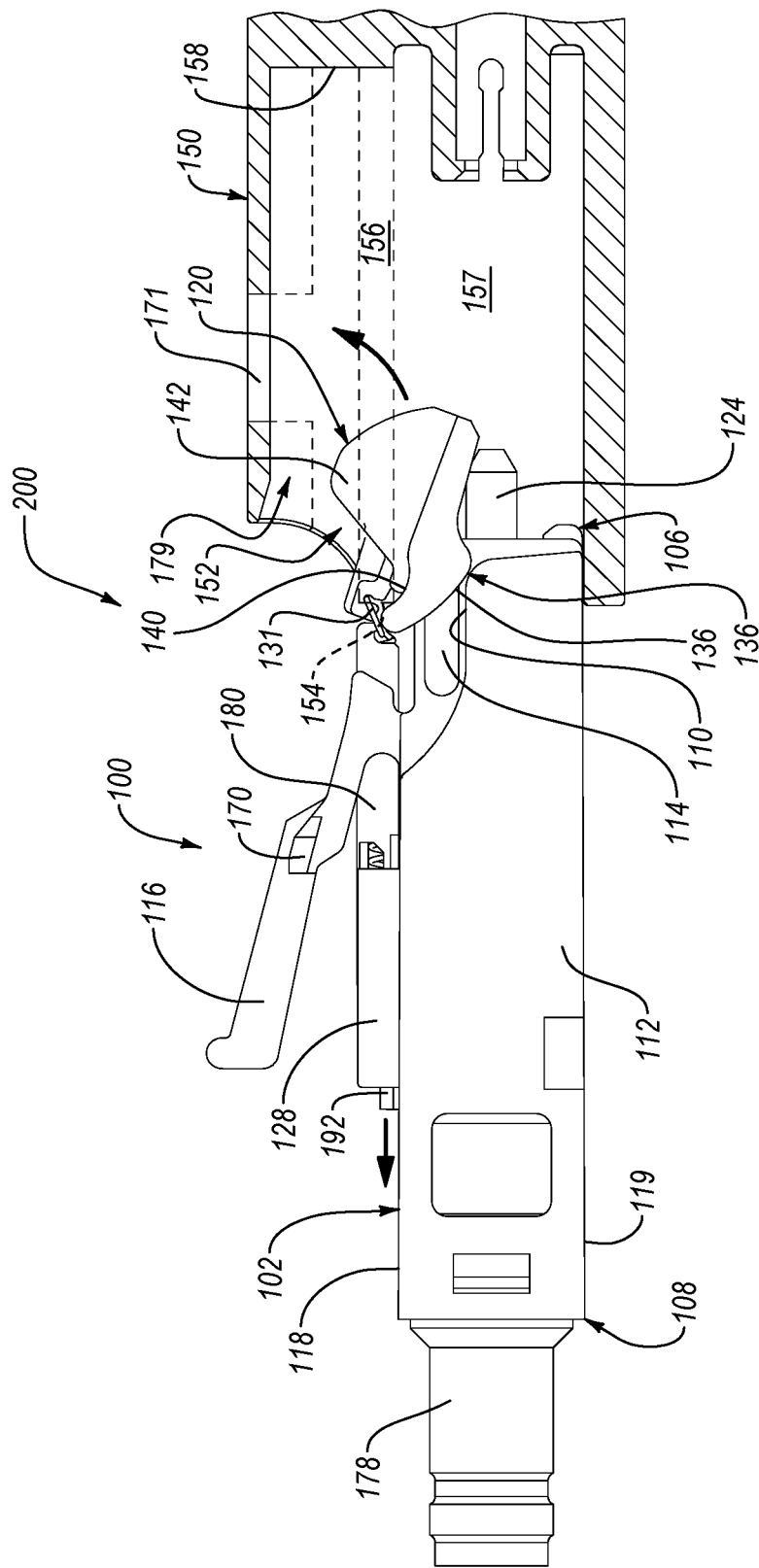
FIG. 6A is a side elevation, schematic view of a fiber optic cable system, which includes the fiber optic connector plug of FIG. 1A, according to one or more examples of the present disclosure.
Figure 6B:
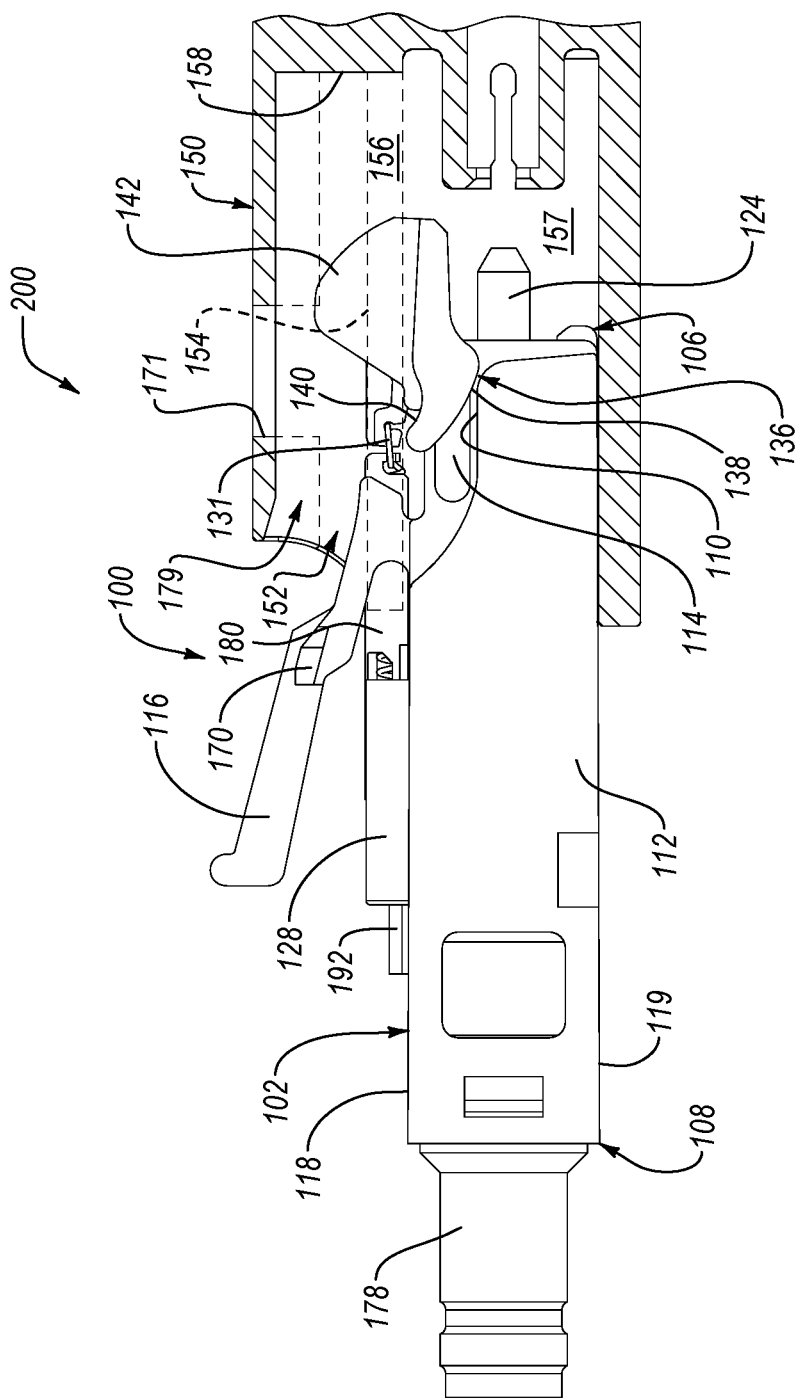
FIG. 6B is a side elevation, schematic view of the fiber optic cable system of FIG. 6A, according to one or more examples of the present disclosure.

Referring to FIG. 6B, after the concave surfaces 140 move past the external surfaces of the ledges 154 and the shutter 120 stops pivoting, the shutter 120 remains in the pivoted position due to continual contact between the lever arms 136 and the underside of the ledges 154. The translational position of the shutter 120 relative to the housing 102 does not change during insertion of the fiber optic connector plug 100 into the connector receptacle 152 until the shutter 120 contacts an end wall 158 of the connector receptacle 152 (see, e.g., FIG. 7).

After contacting the end wall 158 of the connector receptacle 152, further insertion of the fiber optic connector plug 100 results in the end wall 158 imparting an opening force on the shutter 120, which effectively pushes the shutter 120 rearwardly relative to the housing 102 (see, e.g., FIG. 8). The shutter 120 translationally moves rearwardly along the housing 102 until the fiber optic connector plug is fully inserted into the connector receptacle 152 and the shutter 120 is placed in the open position. In some examples, as shown in FIG. 8, leading edges of the latch 116 acts as a stop to prevent further rearward movement of the shutter 120. Generally, in some examples, the shutter 120 contacts the latch 116 when the fiber optic connector plug 100 is fully inserted and the shutter 120 is in the open position. Because the shutter 120 is pivotable and translationally slidable relative to the housing 102, the shutter 120 is able to be completely moved out of the way of the exposed portion of the ferrule 124. In other words, in the open position, an entirety of the shutter 120 is positioned away from (e.g., rearwardly of) the exposed portion of the ferrule 124, in a direction parallel to the central axis 103 and extending from the first end portion 106 to the second end portion 108 of the housing 102.

As the fiber optic connector plug 100 is inserted into and moved in the insertion direction, the engagement prongs 170 of the latch 116 contact underside surfaces of the adapter 150, which urges the latch 116 toward the top side 118 of the housing 102 (see, e.g., FIG. 7). As the fiber optic connector plug 100 is fully inserted into the connector receptacle 152 to position the shutter 120 into the open position, the engagement prongs 170 move past the underside surfaces, which terminate at the prong receptacles 171, and snap into the prong receptacles 172 due to the resilient flexibility of the latch 116. With the engagement prongs 170 received in the prong receptacles 172, engagement between the engagement prongs 170 and the prong receptacles 172 prevents removal of the fiber optic connector plug 100 from the connector receptacle 152.

Referring back to FIGS. 1A-2, the shutter 120 further includes a hood portion 142 that defines a leading end of the fiber optic connector plug 100 when the shutter 120 is in the closed position. The hood portion 142 defines a pocket 143 that receives the exposed portion of the ferrule 124 when the shutter 120 is in the closed position (see, e.g., FIG. 2).

Additionally, the hood portion 142 is more narrow than the housing 102. For example, as shown in FIG. 14, the hood portion 142 has a maximum width W3 that is less than the maximum width W2 of the shutter 120 and less than the maximum width W1 of the housing 102. Moreover, the maximum width W3 of the hood portion 142 is less than a width of the first portion 156 of the connector receptacle 152. Additionally, in certain examples, the maximum width W3 of the hood portion 142 is no more than a minimum distance D2 between the opposing lever arms 136. This enables the hood portion 142 to be received within, and move along, the first portion 156 of the connector receptacle 152 when the shutter 120 is at least partially opened (see, e.g., FIGS. 6A-10).

Additionally, because the first portion 156 and the latch-passthrough portion 179 are on only one side of the second portion 157, the hood portion 142 acts as a keying or alignment feature and the first portion 156 and the latch-passthrough portion 179 act as a keyway that receives the hood portion 142. More specifically, if the fiber optic connector plug 100 were improperly oriented (e.g., upside down) relative to the connector receptacle 152 of the adapter 150, the shutter 120 could not be fully pivoted because there would be nowhere for the hood portion 142 to go, which would quickly bind the fiber optic connector plug 100 relative to the connector receptacle 152 and inform the user that the orientation of the fiber optic connector plug 100 was improper.

In the closed position, the shutter 120 forms a seal (e.g., a dust seal) against the leading end of the housing 102. The seal is sufficient to protect the exposed portion of the ferrule 124 from debris, such as dust, and other contaminants. Moreover, by covering the exposed portion of the ferrule 124, the hood portion 142 protects the exposed portion of the ferrule 124 from impact damage. Because of the biasing element 130, the shutter 120 remains in the closed position until the shutter is automatically opened after at least partial insertion of the fiber optic connector plug 100 into the connector receptacle 152. For example, referring to FIGS. 6A-10, the hood portion 142 is pivoted away from the exposed portion of the ferrule 124 such that the hood portion 142 no longer forms a seal with the housing 102 to fully cover the exposed portion of the ferrule 124. However, because the exposed portion of the ferrule 124 is not uncovered until it is within the connector receptacle 152, protection of the exposed portion of the ferrule 124, from contaminants and impact damage, is now provided by the adapter 150.

Figure 9:
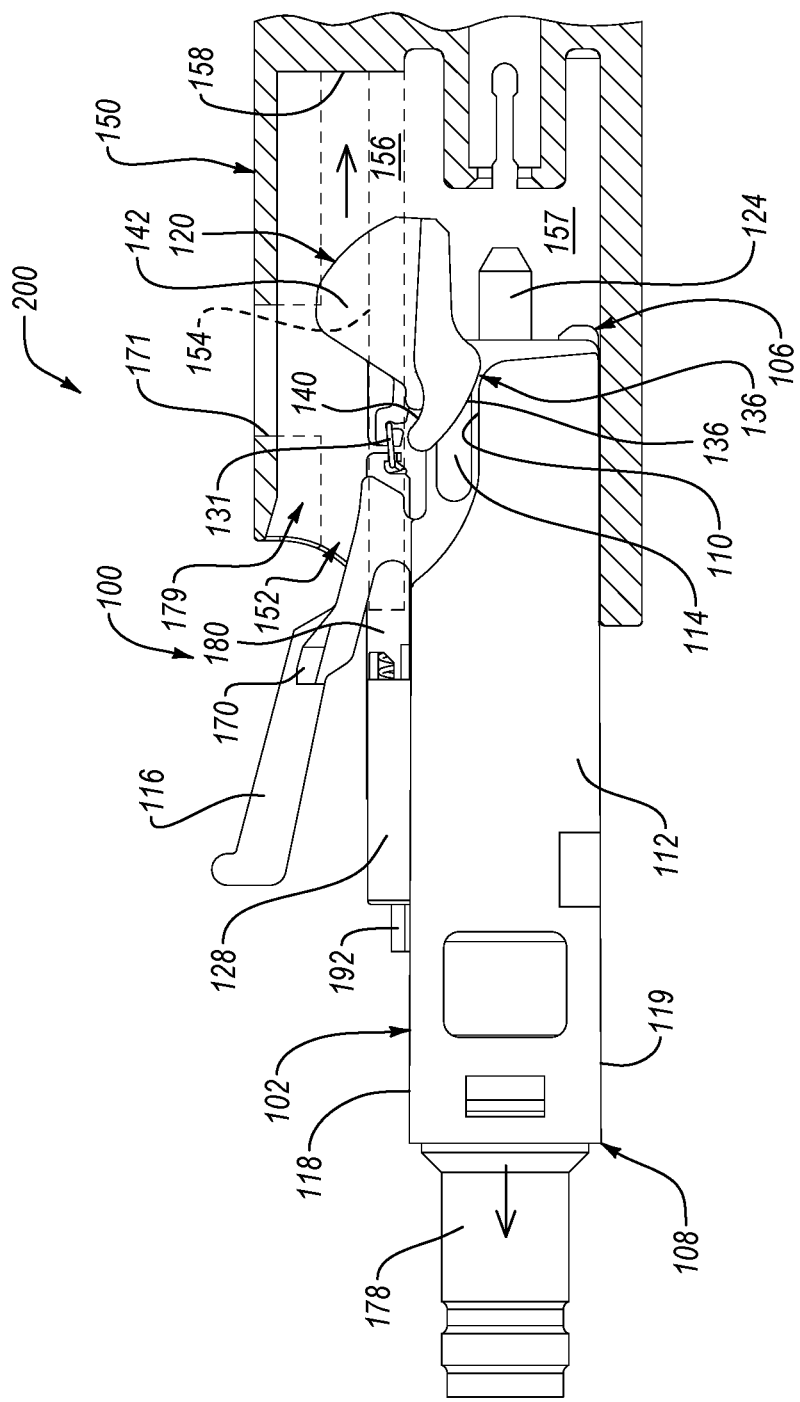
FIG. 9 is a side elevation, schematic view of the fiber optic cable system of FIG. 6A, according to one or more examples of the present disclosure.
Figure 10:
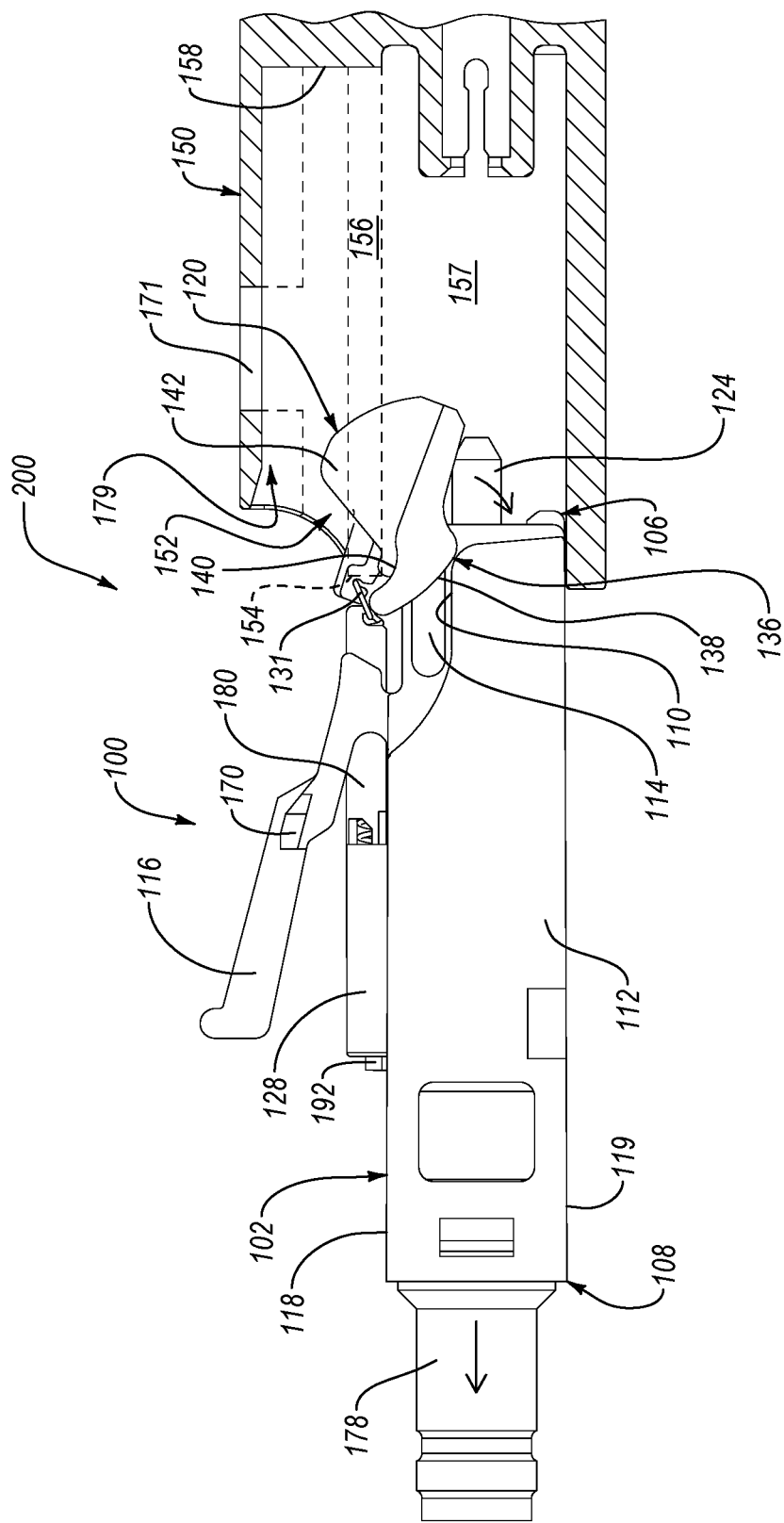
FIG. 10 is a side elevation, schematic view of the fiber optic cable system of FIG. 6A, according to one or more examples of the present disclosure.

Protection of the exposed portion of the ferrule 124 is maintained as the fiber optic connector plug 100 is removed from the connector receptacle 152. Referring to FIG. 9, as the latch 116 is actuated toward the housing 102 to remove the engagement prongs 170 from the prong receptacles 171 of the adapter 150, and the fiber optic connector plug 100 is moved in a removal direction, opposite the insertion direction, the shutter 120 is moved out of contact with the end wall 158, which results in the shutter translationally sliding forwardly relative to the housing 102. Eventually, the concave surfaces 140 of the lever arms 136 of the shutter 120 engage the external surfaces of the opposing ledge 154 of the adapter 150, which promotes a gradual pivoting of the shutter 120 toward the closed position as the fiber optic connector plug 100 is further moved in the removal direction (see, e.g., FIG. 10). Ultimately, further movement of the fiber optic connector plug 100 in the removal direction relative to the adapter 150 results in the shutter 120 returning to the closed position, as shown in FIG. 2. Accordingly, before the exposed portion of the ferrule 124 is removed from the connector receptacle 152, the shutter 120 is in the closed position, thus ensuring the exposed portion of the ferrule 124 is covered and protected before removal from the connector receptacle 152.

According to some examples, the shutter 120 is at least partially compliant, such that the shutter 120 at least partially deforms against the housing 102 to form the seal against the housing 102. In one example, the entirety of the shutter 120 is made of a material that is more compliant (e.g., more pliable or less rigid) than the material of the housing 102. For example, the housing 102 can be made of a hardened plastic and the shutter 120 can be made of rubber. Alternatively, only a portion of the shutter 120, such as just the portion of the shutter 120 that interfaces with the housing 102 to form the seal with the housing 102, is made of a material more compliant than the material of the housing 102. In such an example, the shutter 120 can include an annular gasket around the shutter 120 that interfaces with the housing 102 to form the seal. As used herein, the compliancy of a material is a measure of the ability of the material to elastically flex.

To help prevent dust and other contaminants from contacting the exposed portion of the ferrule 124 when the shutter 120 is in the closed position. The portion of the shutter 120 that interfaces with the housing 102 to form the seal with the housing 102 can include an overlapping portion 129. The overlapping portion 129 overlaps with the housing 102, when the shutter 120 is in the closed position. This introduction of or increase in the overlap between the shutter 120 and the housing 102 increases the length dust and other contaminants, from outside the shutter, must travel to reach an interior of the shutter 120 when the shutter 120 is in the closed position. The longer this length, the hard it is for dust and other contaminants to reach the interior of the shutter 120, and thus the exposed portion of the ferrule 124.

According to some examples, the shutter 120 is more translucent than the housing 102. More specifically, the shutter 120 can be made of a material that is more translucent than the material of the housing 102. As used herein, translucency is the ability of a material to permit the passage of light. Accordingly, more light can pass through a first material, having a first translucency, than a second material, having a second translucency less than the first translucency. The shutter 120, being more translucent than the housing 102, enables a portion of a live optical signal, passing through the fiber optic connector plug 100, to pass through the shutter 120 and be observed by a user. The light passing through the shutter 120 is less intense than the live optical signal itself, but still observable by a user. Accordingly, a user can determine whether the fiber optic connector plug 100 is carrying a live optic signal with the shutter 120 in the closed position, and does not need to uncover the ferrule 124 to make such a determination, which would expose the ferrule 124 to contamination and impact damage.

Referring to FIGS. 3, 11-13, and 15, in some examples, the fiber optic connector plug 100 forms part of a fiber optic cable assembly 202. The fiber optic cable assembly 202 further includes a fiber optic cable 203. The fiber optic connector plug 100 is coupled to an end portion of the fiber optic cable 203. The fiber optic cable 203 includes multiple coaxial layers, including a glass core 122 at a center of the fiber optic cable 203 (see, e.g., FIG. 15). The glass core 122 transmits optical signals through the fiber optic cable 203. The glass core 122 of the fiber optic cable 203 extends through the fiber optic connector plug 100, including the ferrule 124, and terminates at a leading end of the ferrule 124. Accordingly, a portion of the glass core 122 is located within a hollow channel of the ferrule 124. In some examples, the fiber optic cable assembly 202 further includes a sheath 123 that helps couple the fiber optic cable 203 to the fiber optic connector plug 100. The sheath 123 envelopes a portion of the fiber optic cable 203 and a portion of the fiber optic connector plug 100 at the connection interface between the fiber optic cable 203 and the fiber optic connector plug 100.

Figure 13:
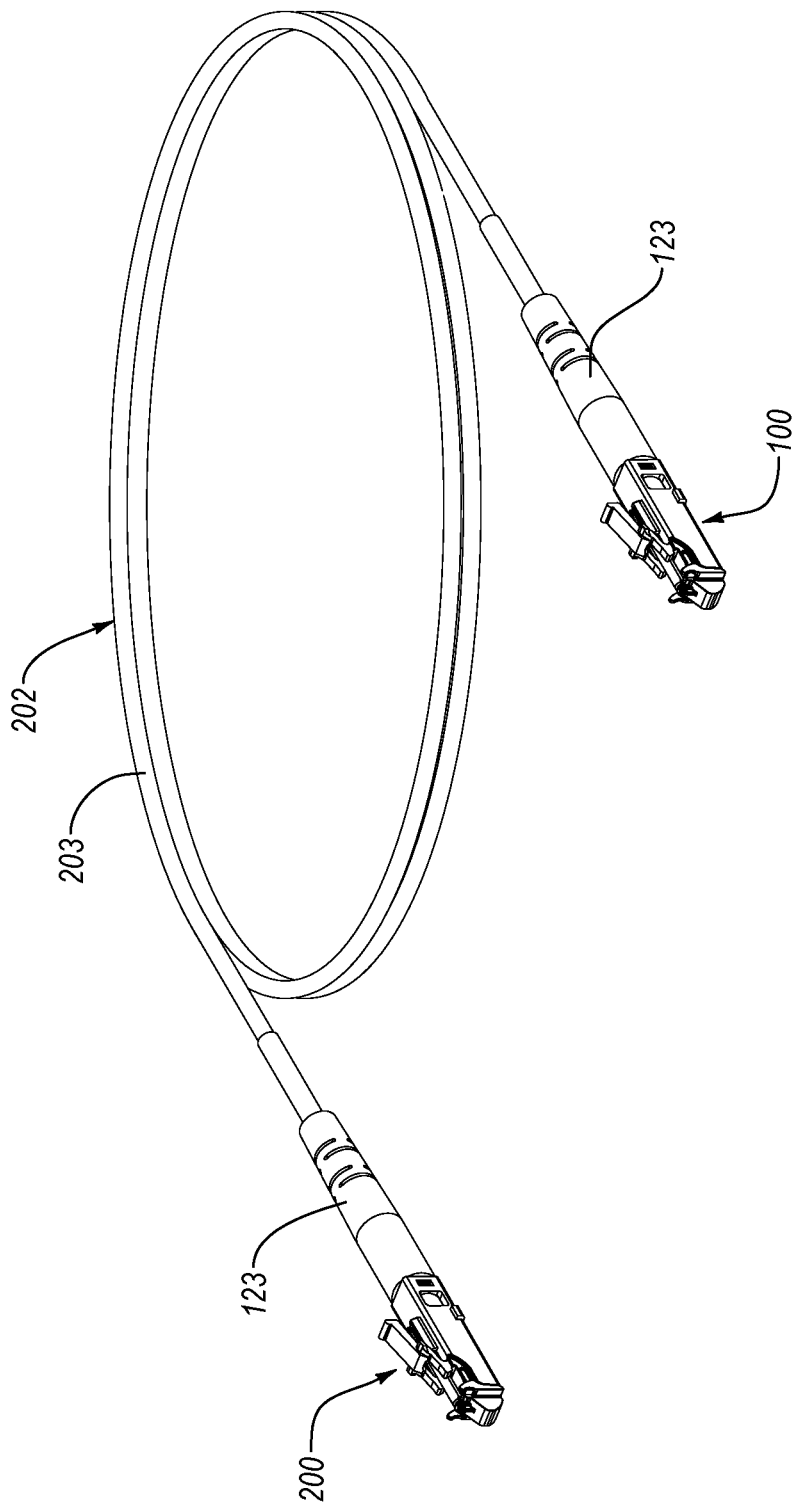
FIG. 13 is a perspective, schematic view of a fiber optic cable assembly, according to one or more examples of the present disclosure.

In some examples, as shown in FIG. 13, the fiber optic cable assembly 202 includes a fiber optic connector plug 100 coupled to both end portions of the fiber optic cable 203. Accordingly, one end of the fiber optic cable assembly 202 can be connected to a first device (e.g., a first adapter), via one of the fiber optic connector plugs 100, and the other end of the fiber optic cable assembly 202 can be connected to a second device (e.g., a second), via the other one of the fiber optic connector plugs 100.

Figure 16:
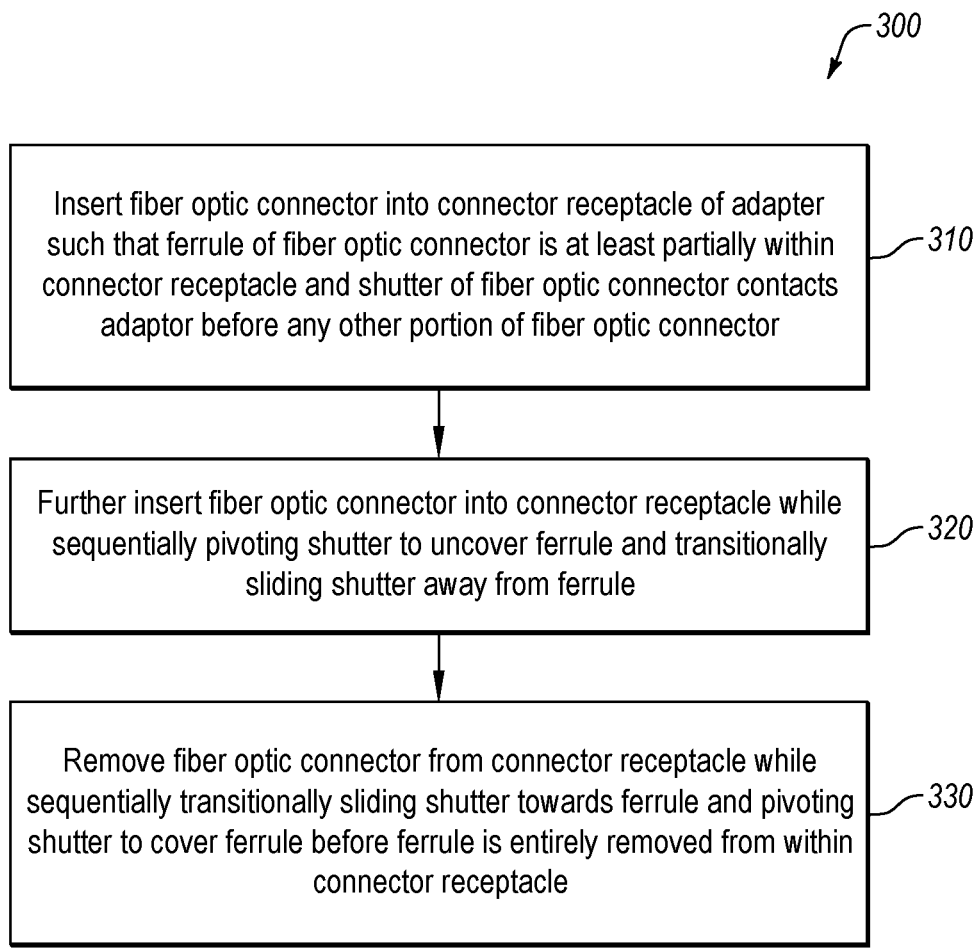
FIG. 16 is a schematic flow chart of a method of connecting a fiber optic connector plug to an adapter, according to one or more examples of the present disclosure.

In view of the foregoing, and according to some examples, a method 300 of connecting the fiber optic connector plug 100 to the adapter 150 is shown in FIG. 16. The method 300 includes (block 310) inserting the fiber optic connector plug 100, with the shutter 120 in the closed position covering the ferrule 124, into the connector receptacle 152 of the adapter 150 such that the ferrule 124 is at least partially within the connector receptacle 152 and such that the shutter 120 contacts the adapter 150 before any other portion of the fiber optic connector plug 100. The method 300 additionally includes (block 320), after inserting the fiber optic connector plug 100 into the connector receptacle 152, such that the ferrule 124 is at least partially within the connector receptacle 152, further inserting the fiber optic connector plug 100 into the connector receptacle 152 while sequentially pivoting the shutter 120 to uncover the ferrule 124 and translationally sliding the shutter 120 away from the ferrule 124. As used herein, in the context of operational steps, sequentially means performing the steps in a logical order or sequence, such as one after the other. Accordingly, in certain examples, sequentially performing two steps means performing the steps non-concurrently or performing the steps one after the other. In some examples, block 320 is performed such that pivoting the shutter 120 occurs before translationally sliding the shutter 120.

According to some examples, the method 300 additionally includes (block 330), after translationally sliding the shutter 120 away from the ferrule 124, removing the fiber optic connector plug 100 from the connector receptacle 152 while sequentially translationally sliding the shutter 120 towards the ferrule 124 and pivoting the shutter 120 to cover the ferrule 124 before the ferrule 124 is entirely removed from within the connector receptacle 152. In certain examples, block 330 is performed such that translationally sliding the shutter 120 occurs before pivoting the shutter 120.

In the above description, certain terms may be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connector plugs may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. Examples of the scope of the present subject matter can be found in the following claims.

What is claimed is:

1. A fiber optic connector plug, comprising:
   a housing, comprising:
      a central axis;
      opposing lateral sides and a top side extending between the opposing lateral sides; and
      an interior channel, extending through the housing, in a direction parallel to the central axis, from a first end portion of the housing to a second end portion of the housing;
   a latch, coupled to the housing at the top side;
   a ferrule, extending from the first end portion of the housing;
   a shutter, coupled to the first end portion of the housing such that the shutter is pivotable and translationally slidable, relative to the first end portion of the housing, between a closed position, in which the shutter covers the ferrule, and an open position, in which the shutter does not cover the ferrule,
   wherein:
      the housing further comprises:
         exterior ledges, each on a corresponding one of the opposing lateral sides of the housing and extending from the first end portion of the housing toward the second end portion of the housing; and
         exterior grooves, each on a corresponding one of the opposing lateral sides of the housing and extending, in a direction that is parallel to the central axis, from the first end portion of the housing toward the second end portion of the housing; and
      the shutter is engaged with the exterior ledges and the exterior grooves of the housing such that the shutter is translationally slidable along the exterior ledges and the exterior grooves and is pivotable about a pivot axis that is perpendicular to the central axis and passes through the exterior grooves.

2. The fiber optic connector plug according to claim 1, further comprising a biasing element coupled to the housing and to the shutter such that the biasing element biases the shutter into the closed position.

3. The fiber optic connector plug according to claim 2, wherein the biasing element comprises a compression spring.

4. The fiber optic connector plug according to claim 3, further comprising a retention receptacle at the top side of the housing, wherein a portion of the compression spring is retained within the retention receptacle.

5. The fiber optic connector plug according to claim 4, wherein:
   the latch comprises a through-slot that is circumferentially closed; and
   the compression spring passes through the through-slot of the latch.

6. The fiber optic connector plug according to claim 1, wherein the shutter is pivotable, about a pivot axis that is perpendicular to the central axis, between the closed position and the open position.

7. The fiber optic connector plug according to claim 1, wherein the shutter is translationally slidable, in a direction parallel to the central axis, between the closed position and the open position.

8. The fiber optic connector plug according to claim 1, wherein, when the shutter is in the open position, an entirety of the shutter is positioned away from the ferrule, in a direction extending from the first end portion of the housing to the second end portion of the housing.

9. The fiber optic connector plug according to claim 1, wherein:
   the shutter comprises opposing pins; and
   each one of the opposing pins is engaged with, slidable along, and rotatable within a corresponding one of the exterior grooves of the housing.

10. The fiber optic connector plug according to claim 1, wherein:
   the first end portion of the housing has a maximum width in a direction perpendicular to the central axis and parallel to the top side;
   the shutter has a maximum width, in a direction perpendicular to the central axis and parallel to the top side; and
   the maximum width of the first end portion of the housing is equal to or larger than the maximum width of the shutter.

11. The fiber optic connector plug according to claim 10, wherein the shutter comprises at least one lever arm that extends above the top side of the housing.

12. The fiber optic connector plug according to claim 11, wherein:
   the shutter comprises opposing lever arms spaced apart from each other in the direction perpendicular to the central axis and parallel to the top side; and
   a maximum distance from one of the opposing lever arms to the other of the opposing lever arms is equal to the maximum width of the shutter.

13. The fiber optic connector plug according to claim 12, wherein:
   each one of the opposing lever arms comprises a convex surface and a concave surface that is opposite the convex surface; and
   the convex surface of each one of the opposing lever arms engages a corresponding one of the exterior ledges when the shutter pivots and translationally slides relative to the first end portion of the housing.

14. The fiber optic connector plug according to claim 11, wherein:
   the at least one lever arm comprises a convex surface and a concave surface that is opposite the convex surface; and
   the convex surface of the at least one lever arm engages one of the exterior ledges when the shutter pivots and translationally slides relative to the first end portion of the housing.

15. The fiber optic connector plug according to claim 10, wherein:

the shutter further comprises a hood portion defining a leading end of the fiber optic connector plug when the shutter is in the closed position;

the hood portion receives the ferrule when the shutter is in the closed position; and the hood portion has a maximum width, in a direction perpendicular to the central axis and parallel to the top side, that is less than the maximum width of the shutter.

16. The fiber optic connector plug according to claim 1, wherein the shutter is more translucent than the housing.

17. The fiber optic connector plug according to claim 1, wherein the shutter comprises an overlapping portion that overlaps with the opposing lateral sides of the housing.

18. A fiber optic cable system, comprising:
- an adapter, comprising a connector receptacle and opposing ledges that define therebetween a first portion of a cross-sectional shape of the connector receptacle, within a plane perpendicular to an insertion direction, wherein the cross-sectional shape of the connector receptacle further comprises a second portion and wherein the second portion is wider than the first portion;
- a fiber optic connector plug, comprising:
    - a housing, comprising:
        - a central axis;
        - opposing lateral sides and a top side extending between the opposing lateral sides; and
        - an interior channel, extending through the housing, in a direction parallel to the central axis, from a first end portion of the housing to a second end portion of the housing;
    - a latch, coupled to the housing at the top side;
    - a ferrule, extending from the first end portion of the housing; and
    - a shutter, coupled to the first end portion of the housing such that the shutter is pivotable and translationally slidable, relative to the first end portion of the housing, between a closed position, in which the shutter covers the ferrule, and an open position, in which the shutter does not cover the ferrule,
- wherein the connector plug is insertable into the connector receptacle of the adapter in the insertion direction such that the opposing ledges contact only the shutter and cause the shutter to pivot, relative to the first end portion of the housing, and such that an end wall of the connector receptacle contacts the shutter and causes the shutter to translationally slide, relative to the first end portion of the housing.

19. A method of connecting a fiber optic connector plug to an adapter, the method comprising:
- inserting the fiber optic connector plug, with a shutter of the fiber optic connector plug in a closed position covering a ferrule of the fiber optic connector plug, into a connector receptacle of the adapter such that the ferrule is at least partially within the connector receptacle and such that the shutter contacts the adapter before any other portion of the fiber optic connector plug; and
- after inserting the fiber optic connector plug into the connector receptacle, such that the ferrule is at least partially within the connector receptacle, further inserting the fiber optic connector plug into the connector receptacle while sequentially pivoting the shutter to uncover the ferrule and translationally sliding the shutter away from the ferrule.

20. The method according to claim 19, further comprising, after translationally sliding the shutter away from the ferrule, removing the fiber optic connector plug from the connector receptacle while sequentially translationally sliding the shutter towards the ferrule and pivoting the shutter to cover the ferrule before the ferrule is entirely removed from within the connector receptacle.

21. A fiber optic cable assembly, comprising:
- a fiber optic cable, comprising a glass core; and
- a fiber optic connector plug, coupled to an end portion of the fiber optic cable and comprising:
    - a housing, through which the glass core extends and comprising:
        - a central axis;
        - opposing lateral sides and a top side extending between the opposing lateral sides; and
        - an interior channel, extending through the housing, in a direction parallel to the central axis, from a first end portion of the housing to a second end portion of the housing;
    - a latch, coupled to the housing at the top side;
    - a ferrule, extending from the first end portion of the housing and within which a portion of the glass core is located; and
    - a shutter, coupled to the first end portion of the housing such that the shutter is pivotable and translationally slidable, relative to the first end portion of the housing, between a closed position, in which the shutter covers the ferrule, and an open position, in which the shutter does not cover the ferrule,
- wherein:
    - the housing further comprises:
        - exterior ledges, each on a corresponding one of the opposing lateral sides of the housing and extending from the first end portion of the housing toward the second end portion of the housing; and
        - exterior grooves, each on a corresponding one of the opposing lateral sides of the housing and extending, in a direction that is parallel to the central axis, from the first end portion of the housing toward the second end portion of the housing; and
    - the shutter is engaged with the exterior ledges and the exterior grooves of the housing such that the shutter is translationally slidable along the exterior ledges and the exterior grooves and is pivotable about a pivot axis that is perpendicular to the central axis and passes through the exterior grooves.

* * * * *